(12) United States Patent
Hunger et al.

(10) Patent No.: US 12,466,457 B2
(45) Date of Patent: Nov. 11, 2025

(54) CARRIAGE WITH GUIDED AUTONOMOUS LOCOMOTION

(71) Applicant: GlüxKind Technologies Inc., Vancouver (CA)

(72) Inventors: Anne Hunger, Vancouver (CA); Zi Wen Huang, Vancouver (CA); Check Hay Janson Chan, Vancouver (CA); Anderson Jia Lin Kwan, Surrey (CA)

(73) Assignee: GlüxKind Technologies Inc., Vancouver (CA)

( * ) Notice: Subject to any disclaimer, the term of this patent is extended or adjusted under 35 U.S.C. 154(b) by 0 days.

(21) Appl. No.: 18/375,117

(22) Filed: Sep. 29, 2023

(65) Prior Publication Data

US 2024/0034380 A1 Feb. 1, 2024

Related U.S. Application Data

(63) Continuation of application No. PCT/CA2022/050142, filed on Feb. 1, 2022.
(Continued)

(51) Int. Cl.
*B62B 5/00* (2006.01)
*B62B 7/08* (2006.01)
(Continued)

(52) U.S. Cl.
CPC .......... *B62B 5/0069* (2013.01); *B62B 5/0056* (2013.01); *B62B 5/0066* (2013.01);
(Continued)

(58) Field of Classification Search
CPC ... B62B 5/0069; B62B 5/0056; B62B 5/0066; B62B 7/08; B62B 5/0033; B62B 5/0036;
(Continued)

(56) References Cited

U.S. PATENT DOCUMENTS 10,173,711 B1 * 1/2019 Correa ..................... B62B 9/22
2010/0044164 A1 2/2010 Thorne
(Continued)

FOREIGN PATENT DOCUMENTS

| CA | 2022050142 | 10/2022 |
|---|---|---|
| WO | WO2010028235 A1 | 3/2010 |
| WO | WO2013149642 A1 | 10/2013 |
| WO | WO2019027161 A1 | 2/2019 |
| WO | WO2020256180 A1 | 12/2020 |

*Primary Examiner* — Abby Lin
*Assistant Examiner* — Esvinder Singh
(74) *Attorney, Agent, or Firm* — Caldwell Intellectual Property Law

(57) ABSTRACT

Aspects relate to systems and methods for guided autonomous locomotion of a carriage, including a compartment configured to ensconce a child, a frame configured to support the compartment, a drive motor, a drivetrain operatively coupled to the drive motor; a drive wheel rotatably affixed to the frame, configured to contact a support surface and operatively coupled to the drivetrain, wherein operating the at least a drive motor causes the at least a drive wheel to rotate, an environmental sensor configured to sense an environmental characteristic related to an environment substantially surrounding the carriage; a battery configured to power the at drive motor and a controller configured to control the drive motor in response to the environmental characteristic.

18 Claims, 25 Drawing Sheets

Related U.S. Application Data

(60) Provisional application No. 63/168,668, filed on Mar. 31, 2021.

(51) Int. Cl.
*B62B 9/08* (2006.01)
*G05D 1/00* (2024.01)

(52) U.S. Cl.
CPC .............. *B62B 7/08* (2013.01); *B62B 9/08* (2013.01); *G05D 1/0231* (2013.01)

(58) Field of Classification Search
CPC ...... B62B 9/12; G05D 1/0231; G05D 1/0088; G05D 1/0214; G05D 1/0055; G05D 1/0246; B25J 5/007; B25J 9/1664; B25J 9/1666; B25J 9/1674; B25J 9/1676; B25J 11/009; B25J 19/021; B25J 19/023
See application file for complete search history.

(56) References Cited

U.S. PATENT DOCUMENTS

| | | | |
|---|---|---|---|
| 2015/0144411 A1* | 5/2015 | Washington | B62B 9/005 |
| | | | 180/167 |
| 2017/0142247 A1 | 5/2017 | Heo et al. | |
| 2019/0040921 A1* | 2/2019 | Zhao | B60T 1/065 |
| 2019/0247611 A1* | 8/2019 | Karp | A61M 21/02 |
| 2019/0308652 A1* | 10/2019 | Green | B60T 8/1701 |
| 2021/0064048 A1* | 3/2021 | Dariush | G05D 1/0246 |
| 2021/0208595 A1* | 7/2021 | Kim | G06V 10/82 |
| 2021/0309275 A1* | 10/2021 | Lee | B62B 9/14 |
| 2021/0331313 A1* | 10/2021 | Klingensmith | B25J 11/00 |
| 2022/0212706 A1* | 7/2022 | Jones | B60L 15/20 |
| 2022/0274638 A1* | 9/2022 | Hejduk | B62B 5/0033 |
| 2023/0219611 A1* | 7/2023 | Taylor | B62B 7/142 |
| | | | 280/39 |

\* cited by examiner

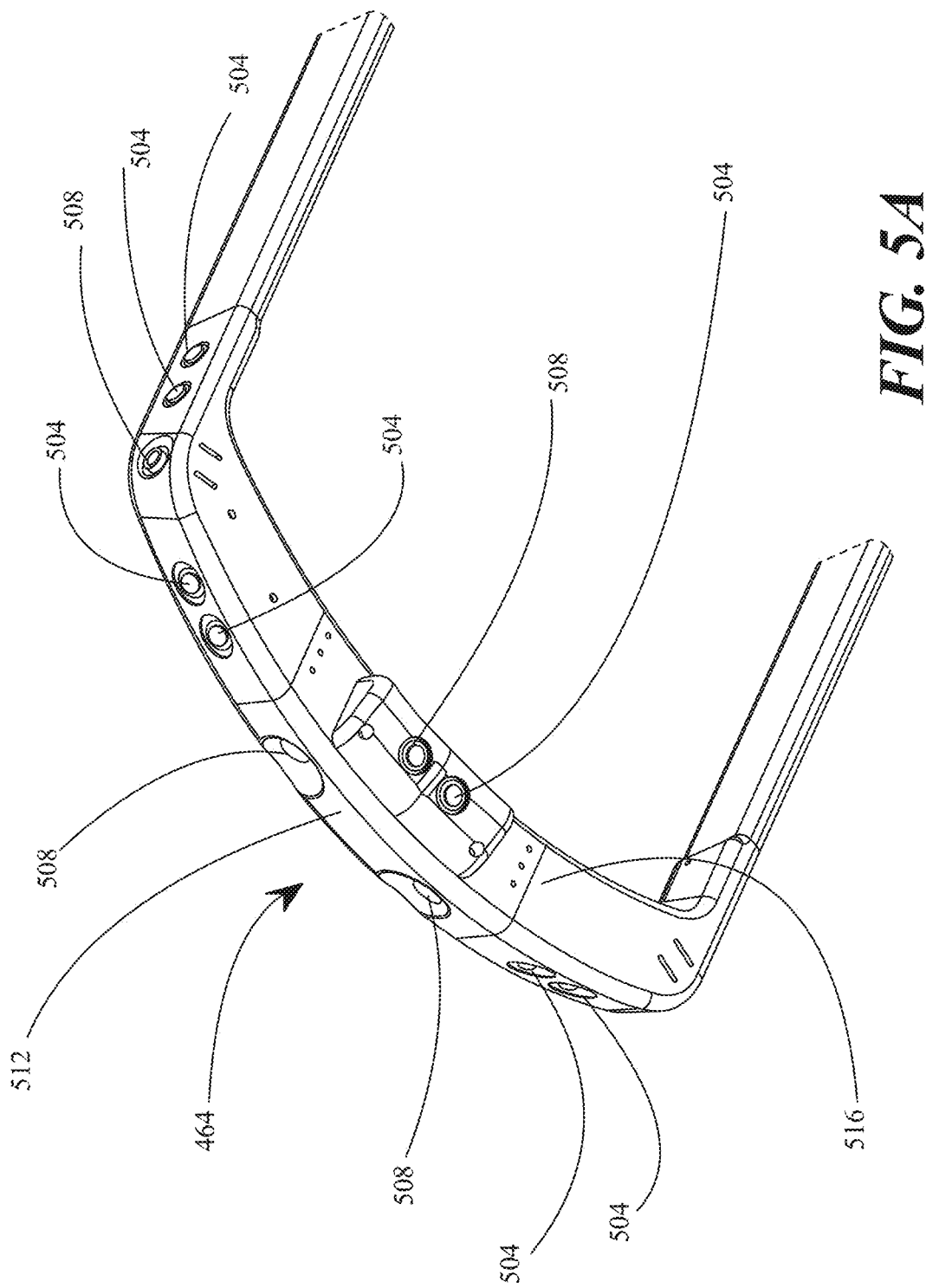

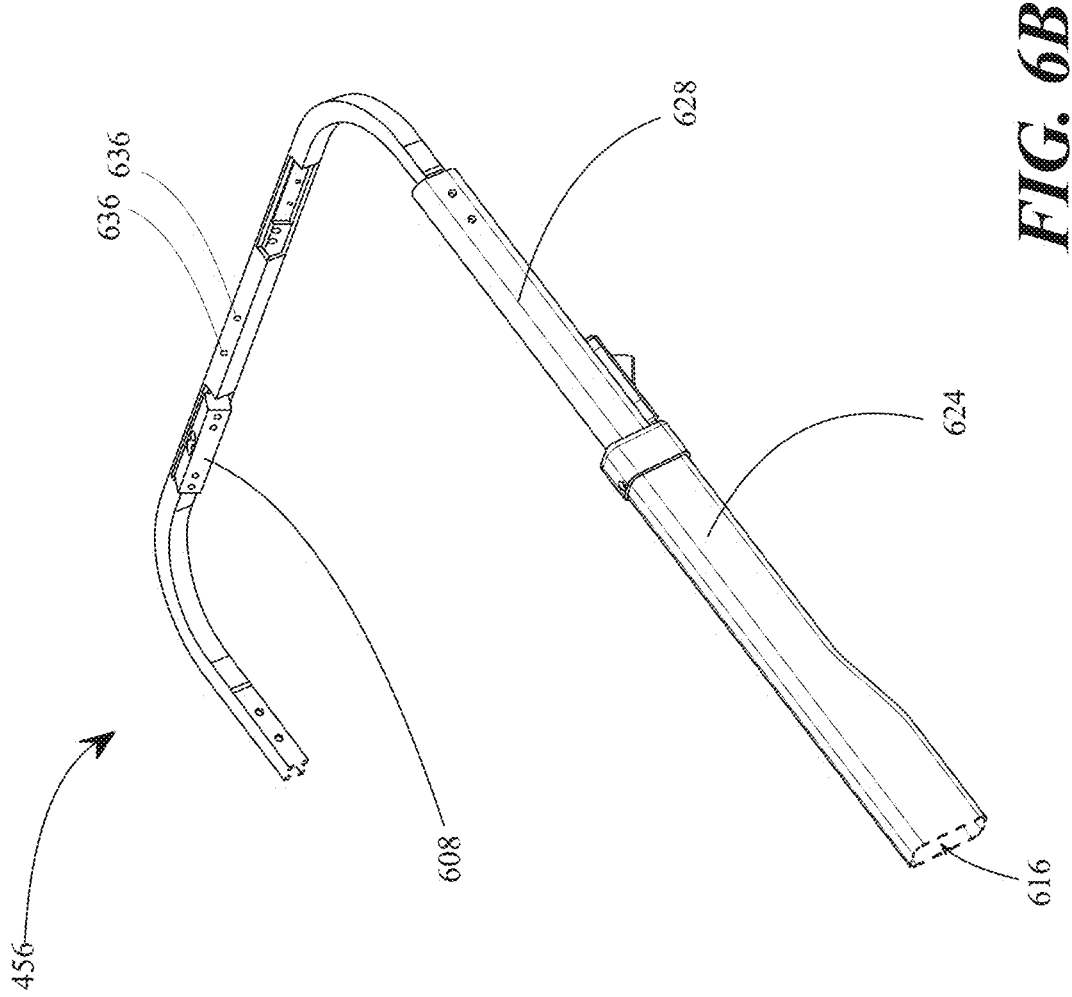

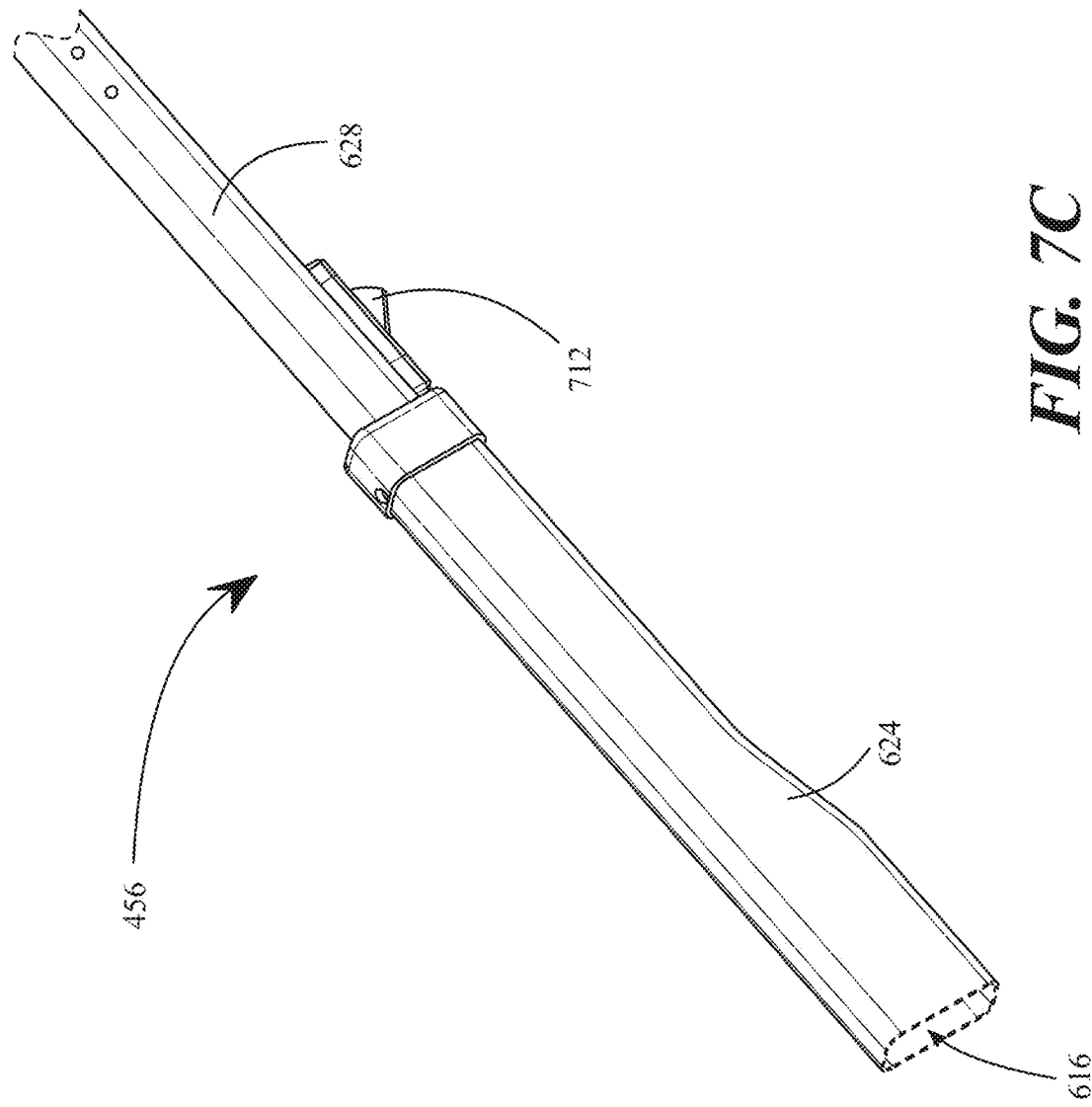

CARRIAGE WITH GUIDED AUTONOMOUS LOCOMOTION

CROSS-REFERENCE TO RELATED APPLICATIONS

This application is a continuation-in-part of International Application No. PCT/CA2022/050142, filed on Feb. 1, 2022, entitled "CARRIAGE WITH GUIDED AUTONOMOUS LOCOMOTION" which claims the benefit of priority of U.S. Provisional Patent Application Ser. No. 63/168,668, filed on Mar. 31, 2021, entitled "SYSTEMS AND METHODS FOR GUIDED AUTONOMOUS LOCOMOTION OF A CARRIAGE," each of which are incorporated by reference herein in their entirety.

FIELD OF THE INVENTION

The present invention generally relates to the field of surface transportation. In particular, the present invention is directed to a carriage with guided autonomous locomotion.

BACKGROUND

Presently, baby-strollers are unsafe and vulnerable to user error, e.g., using the stroller while performing other tasks, such as soothing babies or chasing toddlers. Even the most watchful parent may find herself, at times, without complete control of the stroller during the course of an outing. An uncontrolled stroller is potentially dangerous to the child within; for example, two baby-stroller related accidents requiring an emergency room (ER) visit occur every hour in the United States.

SUMMARY OF THE DISCLOSURE

In an aspect, a carriage with guided autonomous locomotion includes a compartment configured to ensconce a child, a frame configured to statically support the compartment, a drive motor, a drivetrain operatively coupled to the drive motor, a drive wheel rotatably affixed to the frame, configured to contact a support surface, and operatively coupled to the drivetrain, wherein operating the drive motor causes the drive wheel to rotate, an environmental sensor configured to sense an environmental characteristic related to an environment substantially surrounding the carriage, and a controller configured to control the drive motor in response to the environmental characteristic.

In another aspect, a method of guided autonomous locomotion of a carriage includes ensconcing, using a compartment, a child; statically supporting, using a frame, the compartment, operating a drive motor, rotating a drive wheel rotatably affixed to the frame, configured to contact a support surface, and operatively coupled to the drive motor by way of a drivetrain, sensing, using an environmental sensor, an environmental characteristic related to an environment substantially surrounding the carriage, and controlling, using a controller, the drive motor in response to the environmental characteristic.

In another aspect, a method of guided locomotion of a carriage includes operating, using a controller, a drive motor, where operating the drive motor causes rotation of a drive wheel configured to contact a support surface and operatively coupled to the drive motor by way of a drivetrain; receiving, using the controller, an environmental characteristic related to an environment substantially surrounding the carriage, receiving, using the controller, an operator characteristic related to an operator of the carriage, and controlling, using a controller, the drive motor in response to the environmental characteristic and the operator characteristic.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 5A and 5B are illustrations of an exemplary embodiment of a body of carriage in accordance with one or more embodiments of the present disclosure;

FIGS. 6A and 6B are illustrations of an exemplary embodiment of a handle of carriage in accordance with one or more embodiments of the present disclosure;

FIGS. 7A-7C are illustrations of an adjustment of the handle of carriage in accordance with one or more embodiments of the present disclosure;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a carriage with guided autonomous locomotion. In an embodiment, at least an environmental sensor may be configured to sense a characteristic of an environment surrounding the carriage; and movement of the carriage may be controlled in response to the characteristic of the environment. For example, in some cases, an environmental sensor may include an imaging device or machine vision system, and locomotion of carriage may be controlled in response to detections by the imaging device so that carriage may be, for example, safely propelled along a support surface, such as a sidewalk, and stopped at potentially dangerous environmental detections, such as at street crossings.

Aspects of the present disclosure can be used to automatically propel a carriage (e.g., a baby stroller) without a need for an operator (e.g., a parent, guardian, or other person operating the carriage, such as a caregiver) to push. For example, and without limitation, so long as operator is detected to be within a certain range or distance from carriage, carriage may be self-propelled by one or more motors of carriage. Aspects of the present disclosure can also be used to automatically stop a carriage without involvement of an operator. This is so, at least in part, to prevent a carriage from running away and potentially injuring a child within.

Aspects of the present disclosure allow for autonomous, albeit guided, locomotion of a carriage. Exemplary embodiments illustrating aspects of the present disclosure are described below in the context of several specific examples.

Figure 1A:
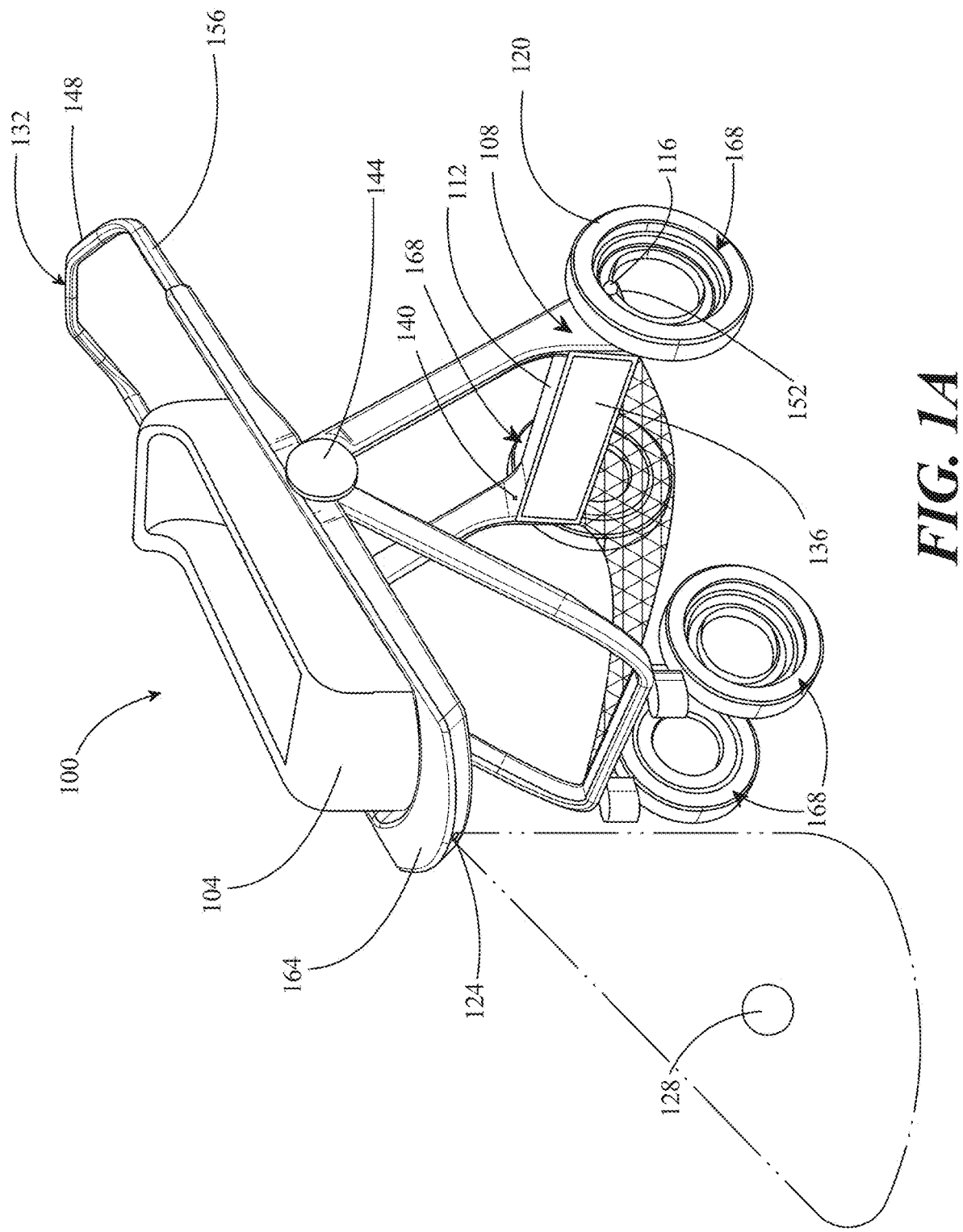
FIGS. 1A and 1B are illustrations of a first exemplary embodiment of a carriage with guided autonomous locomotion in accordance with one or more embodiments of the present disclosure.
Figure 1B:
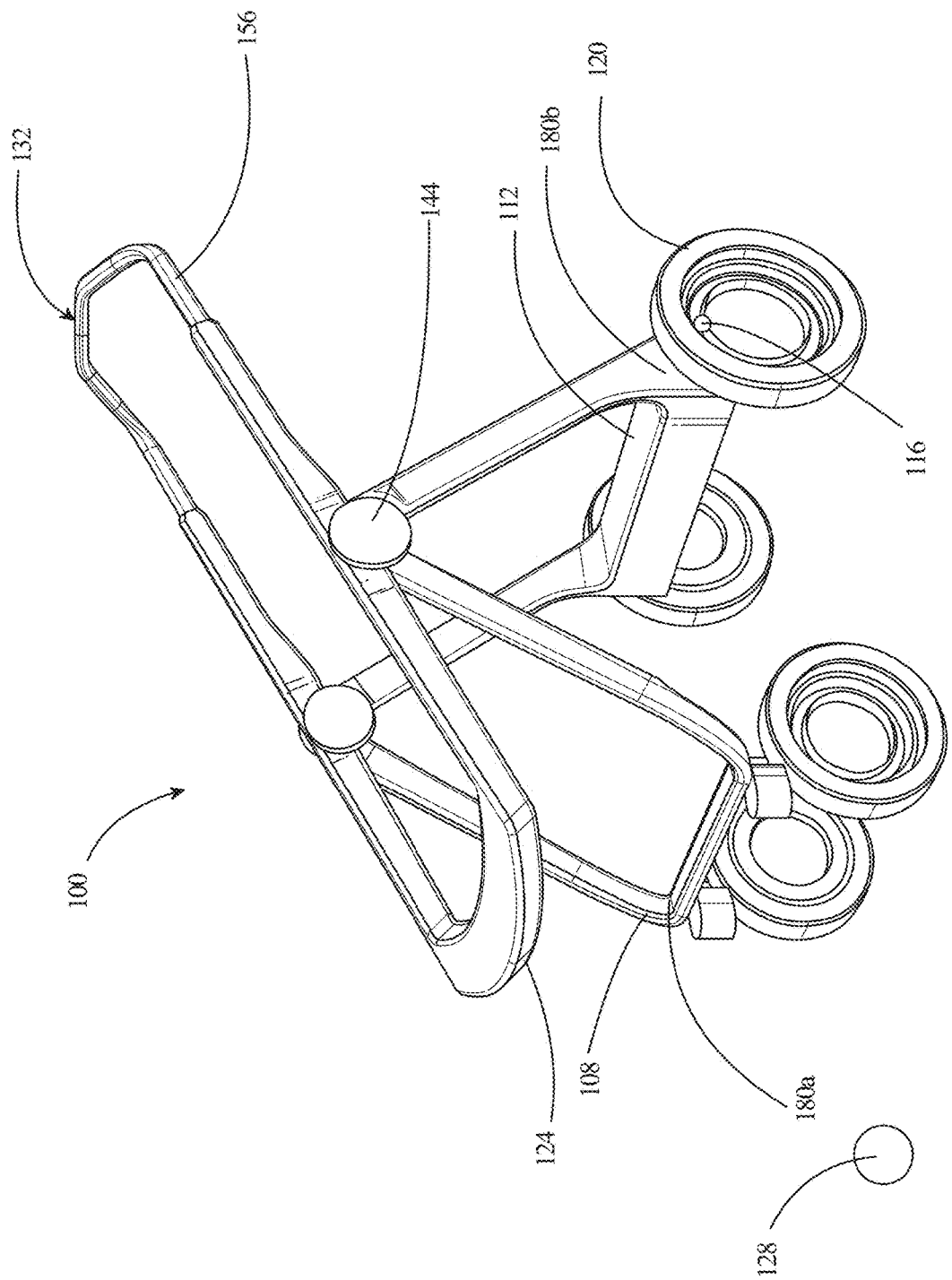

Referring now to the drawings, FIGS. 1A and 1B illustrate a first exemplary embodiment of a carriage 100 with guided autonomous locomotion. Carriage 100 may include a compartment 104 configured to ensconce a child, as shown in FIG. 1A. In some embodiments, compartment 104 may include, without limitation, a stroller seat, a bassinet, or a car seat. Compartment 104 is statically supported by a frame 108. Compartment 104 may be forward-facing, where a primary opening of compartment 104 is facing a body 164 of frame 108 (as shown in FIG. 1A), or rear-facing, where primary opening of compartment 104 is facing a handle 148 of frame 108. In some embodiments, frame 108 may comprise an extrusion, such as without limitation, a hollow aluminum extrusion. Alternatively or additionally, in some embodiments, frame 108 may comprise a composite material, such as without limitation carbon fiber and resin. In another non-limiting example, frame 108 may comprise fiberglass. Frame 108 may comprise one or more frame elements, such as without limitation posts, beams, crossbraces, and/or members, which may be secured, without limitation by one or more of fasteners, welds, brazes, or adhesives. In some cases, compartment 104 may be removably affixed to frame 108, such that the compartment may be installed or removed from the frame by an operator. Compartment 104 may be removably affixed to frame 108, without limitation by way of one or more fasteners, snaps, threads, camlocks, and the like.

With continued reference to FIGS. 1A and 1B, according to embodiments, compartment 104 may include one or more electronics each configured to stimulate or interact with a child. Such electronics may include for example, a speaker, lights, a screen, a motor, a memory, a microcontroller, or any combination thereof. In some embodiments, compartment 104 may be configured to oscillate via a motor along one or more axes relative to carriage 100. Compartment 104 may be configured to oscillate at one or more speeds and at one or more distances alone the one or more axes relative to carriage 100. Compartment 104 may additionally, or exclusively, be configured to rumble, rock, or shake via a motor at one or more speeds. Compartment 104 may be configured to play one or more sound files stored in a memory or storage device (shown in FIG. 12) at one or more volumes, such as, for example, white noise. Compartment 104 may be configured to display one or more patterns with lights or on a screen. Compartment 104 may include one or more sensors, such as sensors described further below in this disclosure, to monitor or detect physical characteristics of the child and/or compartment 104. For example, and without limitation, an operator may monitor the child in compartment 104 when compartment is forward-facing by a camera disposed within compartment 104 and a display provided on, for example, handle 148 of carriage 100.

Still with reference to FIGS. 1A and 1B, in some embodiments, carriage 100 additionally may include a drive motor 112. In some embodiments, drive motor 112 may include a single motor. In other embodiments, drive motor 112 may include a plurality of motors. For example, drive motor 112 may include a motor that operates each wheel of carriage 100 or a motor that operates various components of carriage, such as a telescoping of a handle, as discussed further in this disclosure. In some embodiments, drive motor 112 may include any of a DC motor, a stepper motor, a brushless motor, and a servo motor. Alternatively or additionally, in some embodiments, a drive motor may include a pneumatic motor or a hydraulic motor. Drive motor 112 may be operatively coupled to at least a drivetrain 116. In some embodiments, drivetrain 116 may include one or more of a gear, a belt, a chain, a pulley, a shaft, a hydraulic system, a pneumatic system, a friction drive. In some embodiments, a friction drive may be a type of transmission that may include one or more wheels to transfer power, for instance rotational kinetic energy. In some cases, a friction drive includes a drive wheel that may be placed in contact with a driven wheel. In some cases, first drive wheel may be placed orthogonal to second drive wheel; alternatively, the first drive wheel may be placed parallel to the second drive wheel. Like gears, sprockets, and pulleys, rotational power is transferred from drive wheel to driven wheel. Unlike gears and sprockets, rotational power transferred by a friction drive is transferred by way of friction, that is to say friction between a drive wheel and a driven wheel resists slipping between the drive wheel and the driven wheel allowing power transfer.

Continuing in reference to FIGS. 1A and 1B, drivetrain 116 may be further operatively coupled to at least a drive wheel 120. A drive wheel 120 may include any wheel configured to contact a support surface, for example without limitation any of a rim, a tire, or a pneumatic tire. For the purposes of this disclosure, a "support surface" is a surface that portion of carriage, such a wheels of carriage, contacts or biases during movement of carriage. Support surface may include a road, pathway, sidewalk, lane, walkway, or any other surface useable for conveyance and/or locomotion. In some cases, drive wheel 120 may be a hubless wheel; the hubless wheel may be operatively coupled to drivetrain 116 by way of a component having a rotational axis that is parrel and non-concentric to the hubless wheel's rotational axis. Drive wheel 120 may be rotatably affixed to frame 108; for example, the drive wheel may be attached to frame 108, while still being able to rotate. Drive wheel 120 may be affixed to frame 108 using one or more bearings, for example ball bearings, roller bearings, crossed roller bearings, duplexed or multiplexed bearings, and the like. Drive wheel 120 may be rotated (i.e. driven) by drive motor 112 via drivetrain 116.

Continuing in reference to FIGS. 1A and 1B, carriage 100 may include at least an environmental sensor 124 configured to sense at least an environmental characteristic related to external surroundings and/or environment of carriage 100, such as an obstacle 128. Environmental sensor 124 may be attached to frame 108. Environmental sensor 124 may be communicatively connected to a controller 140 of carriage 100, as discussed further in this disclosure below. For the purposes of this disclosure, an "environmental sensor" is a device that monitors and detects characteristics related to external surroundings and/or an environment of carriage 100. For instance, and without limitation, obstacle 128 may include a hazard located along, for example, support surface. For example, and without limitation, an obstacle 128 may include a hazard of an environment, such as a termination of a sidewalk or pathway that, for example and without limitation, leads into a street for motorized vehicles. In other examples, an obstacle may include an obstruction of an environment, such as a rock, vehicle, other carriage, and the like. Alternatively or additionally, carriage 100 may include at least an operator sensor 132 configured to sense at least an operator characteristic related to an operator. Operator sensor 132 may be attached to frame 108. Operator sensor 132 may be communicatively connected to controller 140. For the purposes of this disclosure, an "operator sensor" is a device that monitors and detects characteristics related to an individual controlling carriage, such as an operator, and/or a child placed within carriage. In some embodiments, carriage 100 may include an operator sensor 132 without an environmental sensor, an environmental sensor 124 without an operator sensor 132, both an operator sensor 132 and an environmental sensor 124, or neither an environmental sensor 124 nor an operator sensor 132. In some embodiments, at least an environmental sensor 124 may include, without limitation any of a pressure sensor, a global positioning system (GPS), a touchscreen, a strain gauge, a loadcell, a machine camera and system, a light detection and ranging (LIDAR) system, a proximity sensor, a pressure sensor, a time of flight (ToF) sensor, a hyperspectral imaging system, a visible light or infrared imaging device, such as a camera, a microphone, inertial measurement unit system, an accelerometer, gyroscope, and the like. In some embodiments, an environmental sensor 124 may comprise a computer vision, also called a machine vision, system. A machine vision system may use images from one or more cameras, to make a determination about an obstacle 128 of a surrounding environment. For example, in some cases a machine vision system may be used for world modeling or registration of objects within an environment 128 to a coordinate system that includes carriage 100. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms.

With continued reference to FIGS. 1A and 1B, in an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame. A third dimension of registration, representing depth and/or a z axis, may be detected by comparison of two frames; for instance, where first frame includes a pair of frames captured using a pair of cameras (e.g., stereoscopic camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy-plane of a first frame; a result, x and y translational components and q may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that support surface is substantially parallel to an xy-plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

Still referring to FIGS. 1A and 1B, an exemplary imaging device, such as a camera, that may be included in an environmental sensor 124 (or an operator senser 132) is shown. An imaging camera may include a small, low-power, microcontroller that allows for execution of machine vision applications. In a non-limiting embodiment, imaging device may include a processor and, for example, a 640×480 image sensor operating at a frame rate up to 150 fps. Imaging device may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording. In some embodiments, a machine vision camera may be included that uses an image classifier to make classifications using one or more images. Exemplary classification methods are described in detail below. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A computing device, such as controller 140, and/or another device may generate a classifier using a classification algorithm, defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIGS. 1A and 1B, computing device, such as controller 140, may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIGS. 1A and 1B, computing device, such as controller 140, may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIGS. 1A and 1B, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

In one or more embodiments, controller 140, or any other controller mentioned herein, may include a computing device, as mentioned in this disclosure above. A computing device may include any computing device as described in this disclosure, including without limitation a controller, processor, control circuit, microcontroller, microprocessor, digital signal processor (DSP), and/or system on a chip (SoC). Computing device may include a computer system with one or more processors (e.g., CPUs), a graphics processing unit (GPU), or any combination thereof. Computing device may include a memory component, which may include a memory, such as a main memory and/or a static memory, as discussed further in this disclosure below. Computing device may include a display component, as discussed further below in the disclosure. In one or more embodiments, computing device may include, be included in, and/or communicate with a mobile device, such as a mobile telephone, smartphone, tablet, and the like. Computing device may include a single computing device operating independently, or may include two or more computing devices operating in concert, in parallel, sequentially, or the like. Two or more computing devices may be included together in a single computing device or in two or more computing devices. Computing device may interface or communicate with one or more additional devices, via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks, as described below, across a plurality of computing devices of computing device, which may operate in parallel, in series, redundantly, or in any other manner used for distribution of tasks or memory between computing devices.

In one or more embodiments, computing device may be designed and/or configured to perform any method, method step, or sequence of method steps in any embodiment described in this disclosure, in any order and with any degree of repetition. For instance, computing device may be configured to perform a single step or a sequence of steps repeatedly until a desired outcome or commanded outcome is achieved. Repetition of a step or a sequence of steps may be performed iteratively and/or recursively using outputs of previous repetitions as inputs to subsequent repetitions, aggregating inputs, and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like. Division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still continuing in reference to FIGS. 1A and 1B, carriage 100 may include at least an operator sensor 132 configured to sense at least an operator characteristic related to an operator of the carriage 100. For the purposes of this disclosure, an "operator characteristic" is a detected physical characteristic related to an operator of carriage, such as a parent or caregiver of the child within carriage. In some embodiments, an operator sensor 132 may include, without limitation any of a pressure sensor, a touchscreen, a strain gauge, a loadcell, a machine camera and system, a light detection and ranging (LIDAR) system, a proximity sensor, a time of flight (ToF) sensor, a hyperspectral imaging system, a camera, a microphone, inertial measurement unit system, an accelerometer, and/or gyroscope. In some embodiments, operator sensor 132 may sense a characteristic that is indicative of an operator's presence or movement. For example, and without limitation, operator sensor 132 may detect that an operator's hand is gripping a handle 156 of carriage 100. In another example, and without limitation, a carriage 100 may move according to the operator's movements. For example, and without limitation, carriage 100 may move based on a detection of a presence of an operator within a predetermined distance of carriage 100, such as handle 156. A move of carriage may include a displacement of carriage along an axis, such as an x- or y-axis. If operator is determined by controller 140 to be within predetermined distance from carriage 100 based on data (e.g., data related to a detected operator characteristic) from operator sensor 132, then carriage may automatically move, relative to operator, without operator needing to directly contact carriage 100 to guide or propel carriage 100. For instance, and without limitation, carriage 100 may maintain a speed and direction of movement so long as operator is detected, or carriage may follow operator to maintain a desired distance relative to a detected position and/or speed of operator. If operator is determined by controller 140 to be outside of the predetermined threshold based on received data (e.g., data related to operator characteristic) from operator sensor 132, then carriage may, for example, slow or stop using brake 152, as discussed further in this disclosure below. In some cases, a ToF imager or another range-imaging camera is used to sense an operator characteristic related to an operator's presence or movement, such as without limitation an operator's location relative carriage 100. An exemplary range-imaging camera that may be included in an operator senser 132 (or an environmental sensor 124) is Intel® RealSense™ 430 Module, from Intel® of Mountainview, California, U.S.A. D430 Module comprises active infrared (IR) illumination and a stereoscopic camera, having global shutters and frame rate of up to 90 fps. D430 Module provide a field of view (FOV) of 85.2° (horizontal) by 58° (vertical) and an image resolution of 1280×720. Range-sensing camera may be operated independently by dedicated hardware or, in some cases, range-sensing camera may be operated by a computing device. In some cases, range-sensing camera may include software and firmware resources (for execution on hardware, such as without limitation dedicated hardware or a computing device). D430 Module may be operating using software resources including Intel® RealSense™ SDK 2.0, which include opensource cross platform libraries.

According to embodiments, operator sensor 132 may additionally be configured to sense at least a child characteristic related to the child ensconced in compartment 104.

For the purposes of this disclosure, a "child characteristic" is a physical characteristic related to a child within the carriage. In some embodiments, operator sensor 132 may sense a characteristic that is indicative of a child's presence, movement, or state. For example, and without limitation, a carriage 100 may control compartment's 104 electronics when crying of a child is sensed, such as by playing white noise. In some cases, a pressure sensor is used to sense a child characteristic related to the presence of a child in compartment 104. As another example, a movement sensor and an audio sensor may be used in tandem to sense a characteristic that is indicative of a child fussing, such as movement or the sound of crying.

Still referring to FIGS. 1A and 1B, carriage may include at least a battery 136 configured to power drive motor 112. In some embodiments, battery 136 may include a device for which power that may be produced per unit of volume and/or mass has been optimized. Non-limiting examples of items that may be used as a battery 136 may include batteries used for starting applications including Lithium (Li) ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries 136 may also include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. A battery 136 may include lead-based batteries such as without limitation lead acid batteries and lead carbon batteries. A battery 136 may include lithium sulfur batteries, magnesium ion batteries, and/or sodium ion batteries. Batteries may include solid state batteries or supercapacitors or another suitable energy source. Batteries may be primary or secondary or a combination of both. Persons skilled in the art, upon reviewing the entirety of this disclosure, will be aware of various devices or components that may be used as battery 136.

Continuing to refer to FIGS. 1A and 1B, carriage 100 may include a controller 140 configured to control drive motor 112, for example in response an environmental characteristic and/or an operator characteristic. In some embodiments, controller 140 may include, without limitation any of a controller, such as controller 1004 (shown in FIG. 10), microprocessor, a field programmable gate array (FPGA), a processor, microcontroller, or a computing device, such as computing device 1200 (shown in FIG. 12). According to embodiments, controller 140 can be configured to control the electronics of compartment 104. In some embodiments, controller 140 may be attached to carriage 100. In other embodiments, controller 140 may be remote to carriage 100.

Still referring to FIGS. 1A and 1B, according to some embodiments, carriage 100 may be configured to interface with user, for instance by way of one or more indicators 148, such as with indicator lights or limitation light emitting diodes (LEDs). In some cases, controller 140 may operate one or more indicators 148 based upon an operational state of carriage. For instance, in some circumstances, carriage 100 may have detected the absence of an operator and applied a brake; this operational state, in some cases, may be communicated to the operator by way of one or more indicators 148. In some embodiments, one or more indicators 148 may be located within a handle of carriage 100. In some embodiments, carriage 100 may be configured to interface with a user via a display, such as a display attached to carriage 100 or a display remote to carriage 100. For example, an application may be installed on a mobile device of a user so that a user may monitor and/or control various features of carriage 100 described in this disclosure by communicating with controller 140 of carriage 100.

With continued reference to FIGS. 1A and 1B, controller 140 may be designed and/or configured to perform any method, method step, or sequence of method steps in any embodiment described in this disclosure, in any order and with any degree of repetition. For instance, controller 140 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIGS. 1A and 1B, in some embodiments frame 108 may include a hinge 144 that is configured to fold frame 108. In some cases, folding frame 108 allows for carriage 100 to occupy less space and be stored or transported more conveniently (shown in FIG. 2). In one or more embodiments, hinge 144 may allow for manipulation of one or more components of carriage. In one or more embodiments, hinge 144 may allow for rotation of one or more components of carriage 100 about an axis. In one or more embodiments, hinge 144 may contain gears, to allow for rotation of one or more components. Hinge 144 is described in further detail below, such as in reference to FIG. 3.

Referring again to FIGS. 1A and 1B, in some embodiments, carriage 100 may include a brake 152 configured to prevent rotation of one or more wheels 468, such as drive wheel 120 or a non-drive wheel rotatably affixed to frame 108 and configured to contact support surface. For example, and without limitation, each drive wheel 120 may include brake 152. Controller 140 may be configured to control brake 152 in response to an environmental characteristic and/or an operator characteristic. For example, in some embodiments, presence of operator is an operator characteristic, and if operator is sensed as not present, a brake is applied to slow or stop carriage 100. In some embodiments, presence of operator may be sensed, without limitation, by any of a pressure sensor on handle 156 of carriage 100 or a rear-facing proximity sensor, such as a LIDAR or ToF sensor. In some embodiments, brake may be configured to prevent rotation of a wheel 168, such as a front wheel or a rear wheel, of carriage 100 through electromagnetic braking. In other embodiments, brake 152 may be engaged if environmental sensor 124 detects obstacle 128 of a surrounding environment, such as a hazard or obstacle along support surface. For example, an obstruction, such as a large rock, may be positioned along a pathway; environmental sensor 124 may detect the obstruction and determine that brake 152 must be engaged to prevent carriage 100 from crashing into the obstacle.

Still referring to FIGS. 1A and 1B, in some embodiments, brake 152 may be used to cease or inhibit motion, such as, for example, rotational motion, of at least one wheel, such as drive wheel 120. Commonly, brake 152 may be used to resist, slow, or stop motion of wheel 120 by way of friction; in which energy removed slowing may be converted into heat. Brake 152 may include a plurality of brakes, such as for example, carriage 100 may include a brake for each drive wheel. In some embodiments, brake 152 may be configured to slow and/or cease rotation of drive wheel 120, which is connected to drivetrain 116, through friction braking. In some embodiments, carriage 100 may use a drive motor 112 to slow and/or cease rotation of drive wheel 120 using a generative load, such as, for example, by drawing current from drive motor 112. In many cases, a brake may be comprised of at least two components which may be controllable pressed together to resist, slow, or stop motion. For example, and without limitation, brake 152 may include caliper with two opposing component, such as pads, that move toward each other until each biases a surface of a corresponding wheel, such as drive wheel 120, to apply a compressive force on drive wheel 120. In one or more embodiments, brake 152 may include a rubber brake that engages a wheel, such as drive wheel 120, of carriage 100. In one or more embodiments, brakes 152 may include one or more of a tri-brake system, which may include an electromagnetic motor braking is used to gradually slow wheels 168, a mechanical felt brake, and a pin parking brake. In one or more non-limiting embodiments, and without limitation, electromagnetic brake may slow carriage 100 until a speed of carriage is less than a desired speed such as, for example, less than 1.2 m/s; once speed is less than desired speed then felt brake may engage on an exterior surface of drive motor 112 to continue slowing (e.g., reducing speed or decelerating) carriage 100 down until carriage 100 is stopped or nearly stopped; once carriage 100 is stopped or nearly stopped pin brake may engage for example a disk, such as disk 828 of FIGS. 8A and 8B, or a surface of wheels 168, such as pin holes of drive wheel 120, to stop carriage 100 completely or prevent any movement of wheels 168 of carriage 100. In non-limiting embodiments, brakes 152 may be controlled and/or operated using, for example, servo motors and/or a pulley system. In other embodiments, brake 152 may be manually operated. For example, and without limitation, pin brake may be engaged by a user actuating a button or switch or by operator physically biasing and locking pin against wheel 168. In other non-limiting embodiments, brakes 152 may be automatic and software-managed using sensors and computing device, as discussed in this disclosure. In some situations, brake 152 may be categorized according to characteristics of the at least two components making up the brakes. For instance, brake 152 may include, without limitation, disc brakes, which may include a disc and a pad; drum brakes, which may include a drum and a shoe; or, rim brakes, which may include a rim and a pad. In an embodiment, brakes 152 may include a component comprising a high friction material (i.e. a material with a high friction coefficient), such as, but not limited to, a pad or a shoe. In some non-limiting cases, a high friction material component may be ultimately consumed through use of brakes 152 and may require periodic replacement. In some situations, brakes may be meaningfully categorized according to a mechanism used to force at least two components together to resist, slow, or stop motion. For instance, and without limitation, brakes 152 may include mechanical brakes, for example where a mechanism applies or resists a pressing force; hydraulic brakes, for example where a hydraulic piston applies or resists the pressing force; pneumatic brakes, for example where a pneumatic piston applies or resists the pressing forces; or, electromagnetic brakes, for example where an electromagnet applies or resists the pressing forces. In some instances, brakes may be "normally closed" and apply a pressing force when not engaged. Normally closed brakes may be pre-loaded using any compliance element, such as and without limitation, a spring. Alternatively or additionally, brakes may be "normally open" and apply a pressing for only when engaged.

Still referring to FIGS. 1A and 1B, in some embodiments, brake 152 may resist or stop motion unaided by friction. For example, a rotational locking mechanism which applies a force or moment in direct opposition to rotational motion. In some instances, rotational locking mechanism may include any of a chalk, a dog, a pawl, and the like. In some embodiments, rotational locking mechanism may be used to prevent significantly all rotational movement of a shaft.

Still referring to FIGS. 1A and 1B, alternatively or additionally, brake 152 may include dynamic braking. In some embodiments, brake 152 may include a motor. In other embodiments, drive motor 112 may provide electrical energy to motorize and/or operate brake 152. In some embodiments, an electric motor may be operated to generate electrical energy from rotational movement, thereby slowing the rotational movement. "Dynamic braking", as used in this disclosure, means using at least a motor to resist a motion and/or movement. A motor, which is configured to convert electrical energy to mechanical energy of a rotating shaft, may be understood as an inverse of converting the mechanical energy of the rotating shaft to electrical energy. Both mechanical-to-electrical and electrical-to-mechanical conversions may be accomplished with an interaction of an armature with a moving magnetic field; where, the armature is connected to an electrical circuit acting either as a power supply to induce motion or a power receptor to resist motion. In some embodiments, a drive motor may be used to resist motion by switching from a supply circuit to a receptor circuit, while generating a magnetic field, for example by applying electric current to field coils that generate the magnetic field. An amount of resistance applied to a rotating shaft by a motor when dynamically braking is related to a rate of electrical power generation plus some efficiency loss. In some cases, rate of electrical power generation may be proportional to a strength of magnetic field, controlled for example by current in field coils, and a rate at which an armature and magnetic field rotate relative one another, which is proportional to a rotational velocity of a drive shaft. In some cases, an amount of braking power may be controlled by varying a strength of magnetic field, for example by varying current at filed coils. As a rate of electrical power generation and braking power, are proportional to a rotational velocity of a drive shaft, a stronger magnetic field may be required to maintain braking power as the rotational velocity speed. In some embodiments, there is a lower limit at which dynamic braking may be effective depending on current available for application to field coils. In some cases, an electric motor being used to slow or arrest a rotational movement may be referred to as regenerative braking, when generated electrical energy is stored, for example by a battery, or as rheostatic braking, when generated electrical energy is dissipated, for example by way of one or more resistors. In some cases, a permanent magnet motor may be controlled to resist rotational motion by shorting out two electrical terminals powering the permanent magnet motor. In this case, permanent magnet motor will dissipate all generated energy as heat.

Figure 2:
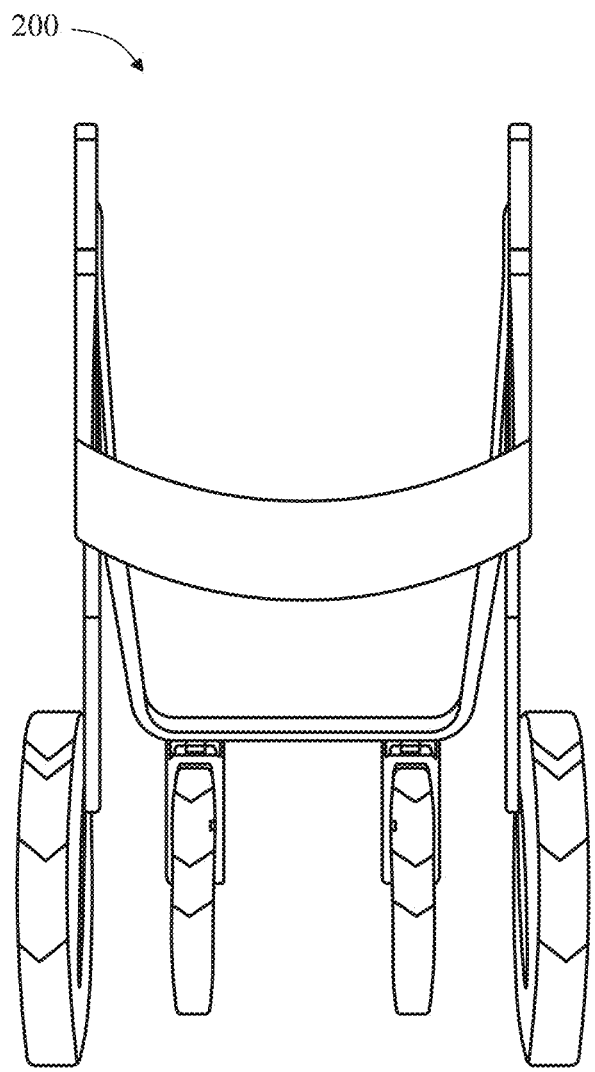
FIG. 2 is an illustration of an exemplary embodiment of a carriage for guided autonomous locomotion in a folded position in accordance with one or more embodiments of the present disclosure.

Referring now to FIG. 2, a non-limiting exemplary representation of a front view of a folded carriage 200 is shown. Folded carriage 200 may, in some cases, have compartment 104 removed for greater space saving. Alternatively or additionally, in some embodiments, folded carriage 200 may have compartment 104 attached. As carriage 100 may include multiple electronic components, for example motors, speakers, lights, sensors, and controllers, carriage 100 may include a plurality of wired connections between electronic components. Alternatively or additionally, in some embodiments, carriage 100 may include electronic components with wireless communication capabilities, such as without limitation Bluetooth. In some embodiments, wires may be run through one or more hollow elements of frame 108. In some cases, folding carriage 200 may be folded using a hinge, such as a planetary gear hinge 300 (shown in FIG. 3) or a link hinge 900 (shown in FIGS. 9A-9C), that is configured to accommodate for wire routing, as discussed further below in this disclosure.

Figure 3:
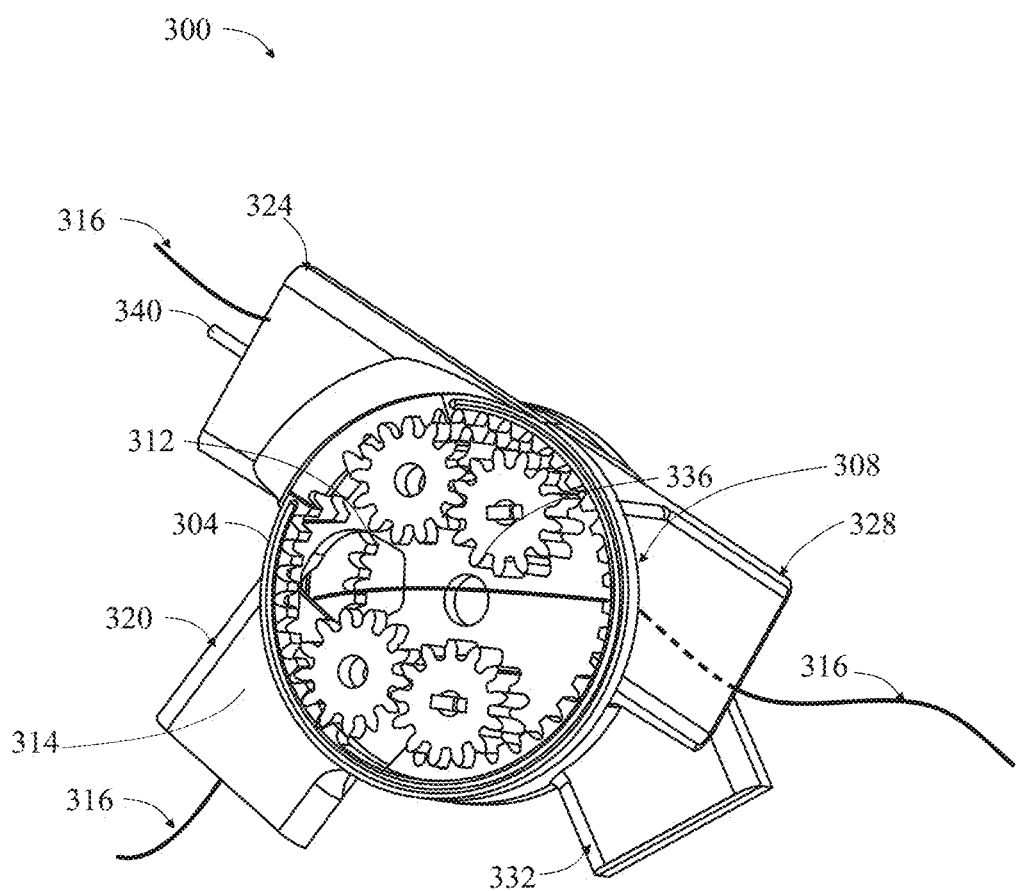
FIG. 3 is an illustration of an exemplary embodiment of a hinge in accordance with one or more embodiments of the present disclosure.

Referring now to FIG. 3, an exemplary embodiment of a hinge 300 is shown. In some embodiments, hinge 300 may include at least a planetary gearbox 304. In some cases, planetary gearbox 304 may include a wireway in which one or more wires may be routed; for example, the wireway may run from a first wire portal 308 to a second wire portal 314 on a second plane of the joint. Planetary gearbox may include, without limitation any of one or more sun gears, one or more ring gears, one or more planet gears, one or more idlers, one or more driven gears, or one or more drive gears. In some embodiments, hinge 300 may be configured to allow at least a wire 316 to be routed through the hinge 300, while in either a folded or unfolded condition. In some cases, hinge 300 may be constituted of multiple layers and at least a wire 316 runs through the multiple layers within hinge 300. In some embodiments, frame 108 may include one or more arms meeting at hinge 300; for instance, hinge 300 may be located at a junction of first arm 320, second arm 324, third arm 328, and fourth arm 332 of frame 108. Hinge 300 may be configured to route at least a wire 316 from any arm to another. In some cases, hinge 300 may include multiple layers affixed to multiple arms; these multiple layers may be held together by way of any fastener, for instance a collar bolt which is attached by way of a threaded hole 336. In some cases, hinge 300 additionally includes a pin 340 that is configured to arrest operation of hinge 300, thereby preventing frame from folding. In some cases, pin 340 is connected to a locking mechanism that is configured to lock at least a layer of hinge 300 or arm of frame 108. In some embodiments, a hinge motor may be operatively coupled to planetary gearbox 304, for example by way of a drive gear, such that the planetary gearbox 304 rotates with the motor; and wherein operating the hinge motor causes hinge 300 to fold frame 108. Arms of frame 108 may include one or more portions of handle 156, body 164, front legs 180a, or rear legs 180b. Arms may be tubular, hollow, and the like. For instance, and without limitation, arms may each include a hollow interior, such as a lumen, that allows for wires to travel through. For example, and without limitation, wires may travel through lumens of arms of frames to controller 140 of carriage 100 so to create a communicative connection between one or more components of carriage 100.

Figure 4:
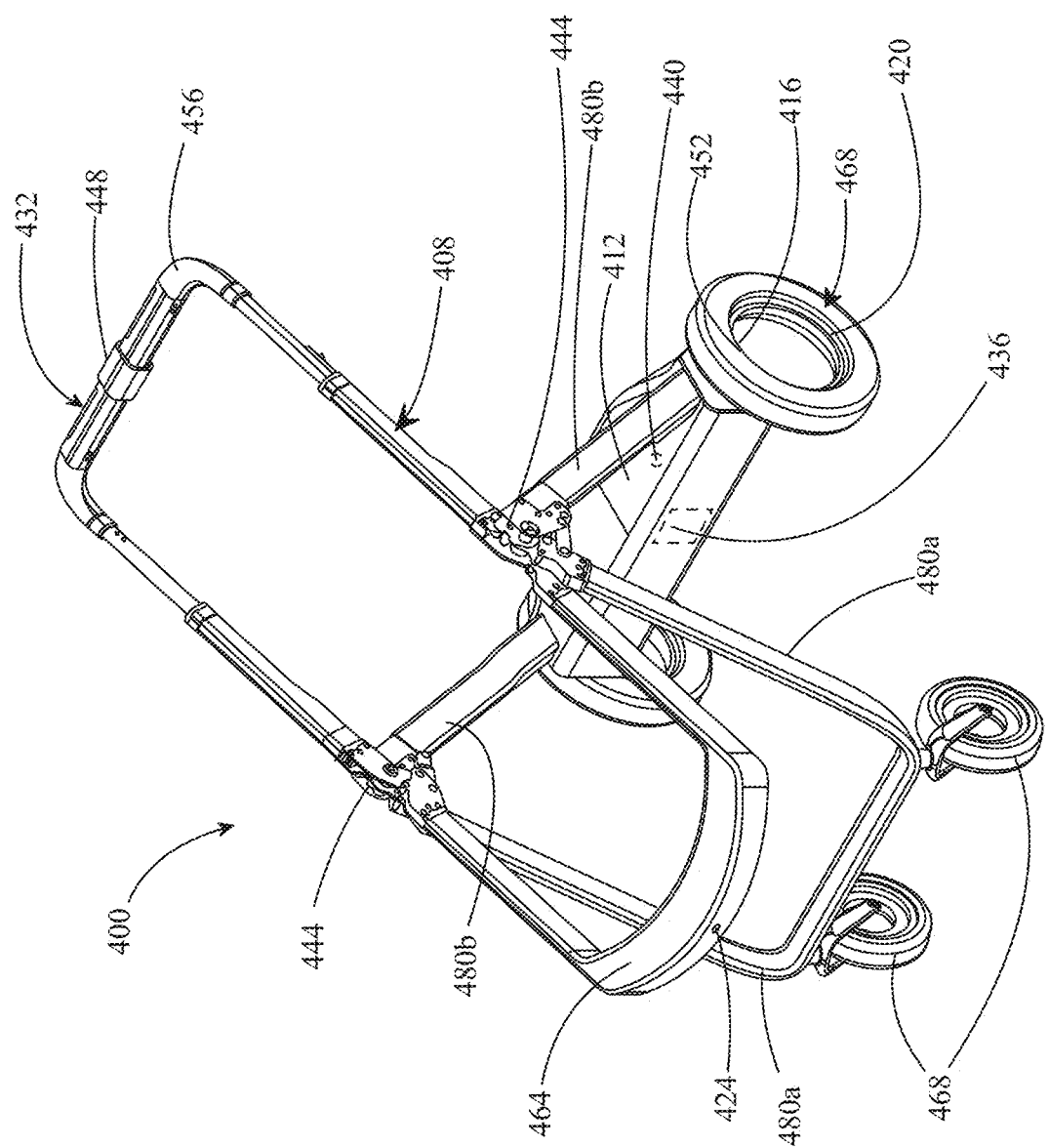
FIG. 4 is an illustration of a second exemplary embodiment of a carriage with guided autonomous locomotion in accordance with one or more embodiments of the present disclosure.

Referring now to FIG. 4, a second exemplary embodiment carriage 400 for guided autonomous locomotion is shown in accordance with one or more embodiments of the present disclosure. Carriage 400 includes a removeable compartment, such as compartment 104 (shown in FIG. 1A), where a child, such as an infant, may be safely placed within carriage 400. Carriage 400 also includes a frame 408. Frame 408 includes a body 464, which compartment 104 may at least partially bias and attach to, a handle 408 that an operator may use to guide or steer carriage 400, and legs 480, which wheels 468 may be attached to. Frame 408 includes a hinge 444 that adjoins body 464, handle 456, and legs 480. Hinge 444 is configured to move so that frame 408 may fold or expand as needed by an operator, as discussed further in FIGS. 9A-9C below. Hinge 444 may be composed of various materials, such as aluminum, titanium, steel, polymeric material, and the like. Carriage 400 may include a battery 436, such as battery 136. Carriage 400 also includes a drive motor 412 and corresponding drivetrain 416, which allows for drive motor 412 to move wheels, such as drive wheels 420, of carriage 400. Drive motor 412 may be controlled and/or operated using a controller 440. In one or more embodiments, carriage 400 may also include sensors, such as environmental sensor 424 and operator sensor 432. Sensors 424,432 may provide detection data to controller 440, which may process the detection datum and provide a control signal to one or more components of carriage 400 in response to the processed detection. As understood by one skilled in the art, any of the components of each embodiment of carriage described in this disclosure may be interchanged and/or combined.

Figure 5B:
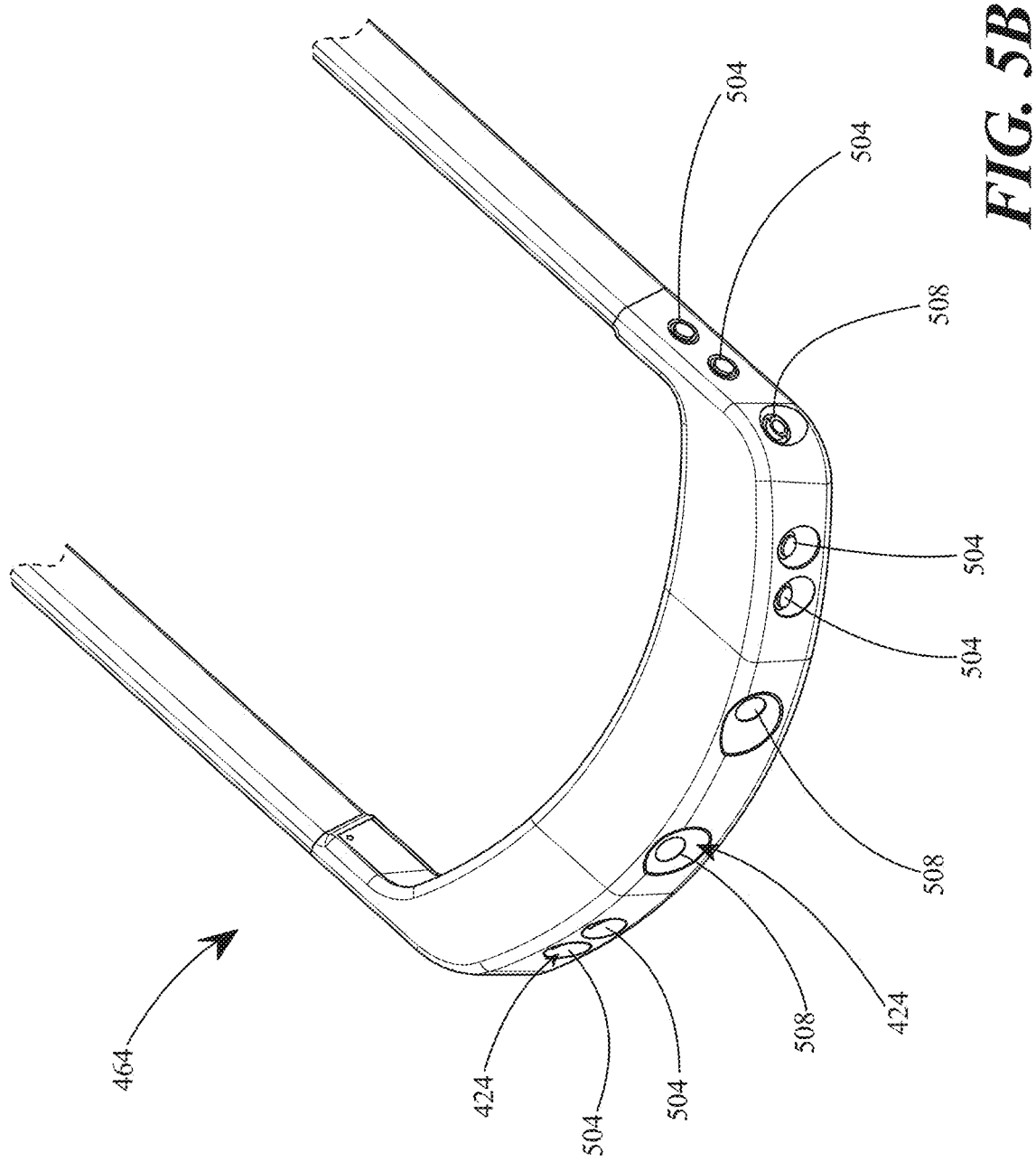

Now referring to FIGS. 5A and 5B, body 464 of frame 408 is shown in accordance with one or more embodiments of the present disclosure. In one or more embodiments, body 464 may be "U"-shaped so that compartment may be disposed therein or atop of body 464. Body 464 may be made from various materials, such as carbon fiber, polymeric material, aluminum, fiberglass, resin, metal alloy, and the like. In one or more embodiments, frame 408 may include one or more sensors, such as environmental sensor 424 and operator sensor 432. For example, and without limitation, environmental sensor 424 may be attached to body 464 or handle 456 of frame 408. Sensors may be positioned on body 464 where sensors are protruding from, are receded into, or are flush with a surface of body 464. In some embodiments, environmental sensor 424 may be positioned along a forward-facing surface 512 or downward-facing surface 516 of body 464 so that environmental sensor 424 may detect any obstacles or environmental hazards within a path of carriage 400. In other embodiments, environmental sensors and operator sensors may be adjustable, for example and without limitation, environmental sensor 424 on a downward-facing surface 516 may be tilted at an angle upward or downward to alter an area and/or region of detection of an environment. In other embodiments, environmental sensors 424 and/or operator sensor 428 may be attached to legs 480, such as front legs of carriage 400 (not shown). Environmental sensors 424 may include any sensors described in this disclosure, such as, but not limited to, environmental sensor 124. In one or more embodiments, environmental sensor 424 may include a plurality of sensors. For example, and without limitation, environmental sensor 424 may include a plurality of ultrasonic sensors 504. In another example, and without limitation, environmental sensor 424 may include a plurality of ultrasonic sensors 504 and imaging devices 508. Imaging devices 508 may include cameras, such as visible light cameras, stereo cameras, and/or infrared cameras. An "ultrasonic sensor", for the purposes of this disclosure, is a sensor that measures a distance to an object using ultrasonic sound waves. In one or more embodiments, an ultrasonic sensor may use a transducer to send and receive ultrasonic pulses. Ultrasonic sensor may generate and send ultrasonic pulses, which may bounce off of an object and received by ultrasonic sensor, thus providing information related to the object's proximity to the ultrasonic sensor. An "imaging device", for the purposes of this disclosure, is a device that may capture an image of an external or environmental region and/or area. Environmental sensors 424 may be directed so that environmental sensors may monitor an environment within a path of carriage 400. For example, and without limitation, if an obstacle or hazard is detected within an area of detection of environmental sensor 424, then controller 440 may receive the detection datum related to the detection by the environmental sensor 424 and generate a control signal in response to the detection, such as, for example, braking carriage 400 to avoid striking the detected environmental obstacle.

Figure 6A:
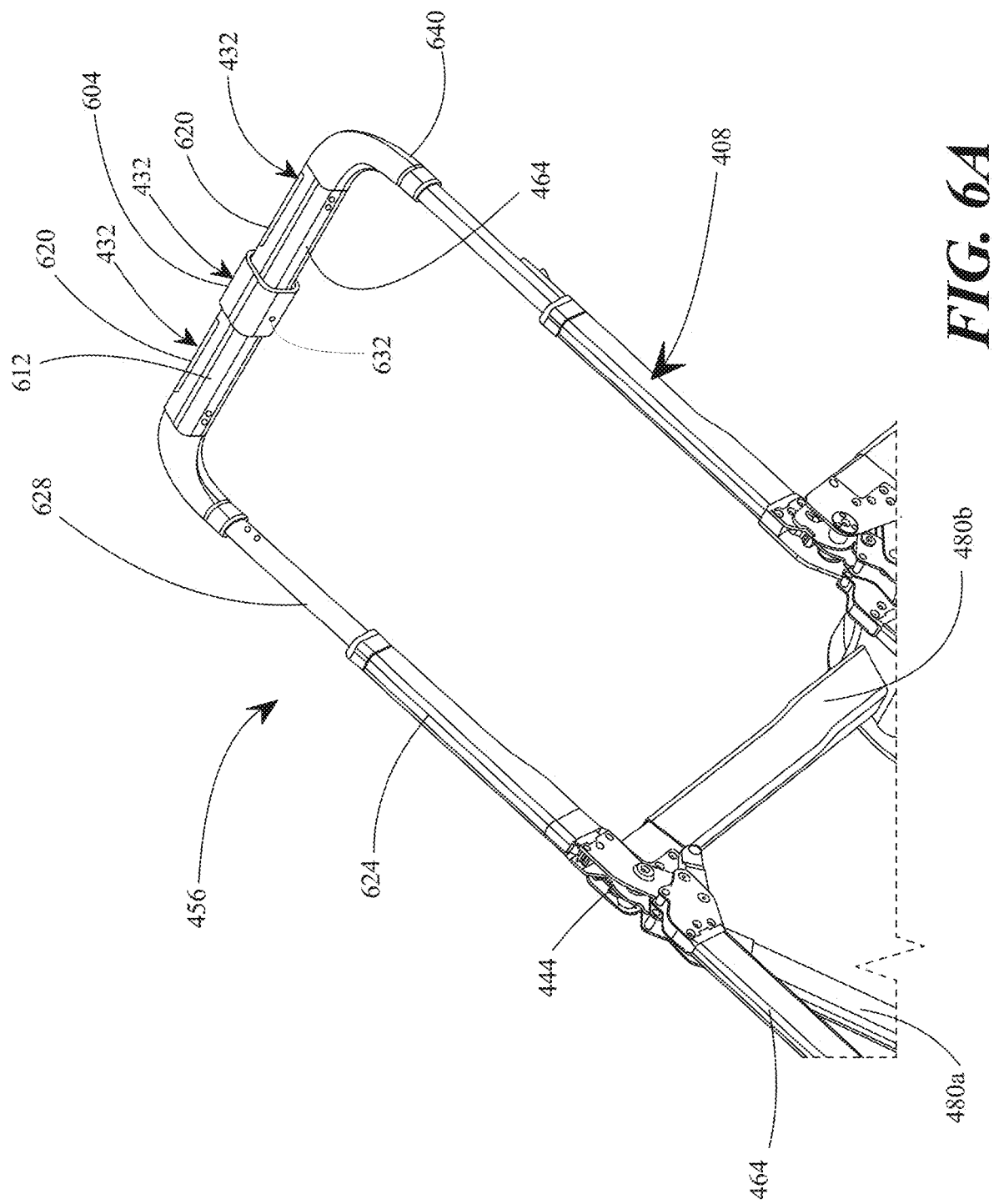

Now referring to FIGS. 6A and 6B, handle 456 of frame 408 is shown in accordance with one or more embodiments of the present disclosure. Handle 456 allows an operator to control and steer carriage 400, such as by pushing or pulling carriage 400 when gripping handle 456. Handle 456 is also configured to provide operator sensor 432 so that carriage 400 may be self-steering and propelling, as discussed in this disclosure. In one or more embodiments, handle 456 may include an adjustable handle, where a first member 628 of handle 456 may be extended from or retracted toward a second member 624 of handle 456, as discussed further in this disclosure below. In one or more embodiments, handle 456 includes one or more operator sensors 432. Operator sensor 432 may include, for example, operator sensor 132 (shown in FIGS. 1A and 1B). Operator sensor 432 may include a pressure sensor that detects when an operator is contacting handle 456, such as load cell sensors. In other embodiments, operator sensor 432 may include a proximity sensor to determine a distance between operator and carriage 400, such as handle 456. In another example, and without limitation, operator sensor 432 may include an ultrasonic sensor to determine a distance between operator and carriage 400, such as handle 456. As previously mentioned in this disclosure, operator sensor 432 may detect an operator characteristic and subsequently transmit the detection to a controller, such as controller 440, for processing. Environmental sensor 424 and operator sensor 432 may be communicatively connected to controller 440 so that environmental sensor 424 and operator sensor 432 may transmit datum related to environment characteristics and operator characteristics, respectively, to controller 440. In one or more embodiments, operator sensor 432 may also include, imaging devices, such as imaging devices 604. Imaging devices 604 may include, for example and without limitation, a visible light camera or an infrared camera. Imaging device 604 may be used to capture an image and transmit the image datum to controller 440 for processing. In one or more embodiments, imaging device 604 may allow controller 440 to determine if an operator is present and whether or not a control function and/or signal related to the image datum should be generated. For example, and without limitation, if imaging datum indicates that an operator is not present, then controller 440 may generate a control signal to engage brake 452 (shown in FIG. 4) of carriage 400 to prevent or slow movement of drive wheels 420. Operator sensors 432 may be used alone or in combination to detect an operator characteristic. Operator sensors 432 may detect a position or movement, such as speed, of operator so that controller 440 may adjust a speed or a direction of carriage 400 in response to the position or movement of operator. Controller 440 may use a threshold to determine if detected movements of operator are substantial enough (e.g., deviate a predetermined amount from an immediately prior detected movement or position) for controller to generate a control signal that alters a current movement or position of carriage 400. For example, and without limitation, if operator only moves a few inches laterally to handle 456, controller 440 may determine that carriage should remain on the current course and that a control signal creating such a course should not be altered.

In one or more embodiments, handle 456 may include LED slots 620, which may illuminate handle 456 so that an operator may readily see handle 456 even in low ambient light and also to provide illumination so that imaging device 604 may more readily detect a presence of operator under low ambient lighting conditions. In one or more embodiments, LED slots 620 may be protected by a cover in order to prevent damage of the lights within the LED slots. In one or more embodiments, the cover may be transparent to provide illumination to handle 456. In one or more embodiments, handle 456 may include an operator sensor 432 such as a load cell sensor 608 that detects a presence of an operator, such as via direct contact with handle 456.

In one or more embodiments, handle 456 may include a hollow tube, such as, for example, a hollow cubic or cylindrical tube. Handle 456 may be hollow so that electrical components of carriage 400 may be disposed therein and/or traversed therethrough. For example, electrical wires and/or cables may traverse through a hollow interior, such as lumen 616, of handle 456. In one or more embodiments, wires may be used to transmit signals, such as sensor signals from sensors 424,432 or control signals from controller 440, between electronic components of carriage 400. Handle 456 may be made from various materials, such as aluminum, fiberglass, steel, titanium, carbon fiber, polymeric materials, and the like. In some embodiments, handle 456 may include a monolithic component. In other components, handle 456 includes multiple components, as shown in FIGS. 6A and 6B. Handle 456 is attached to legs 480 using hinge 444. Hinge 444 may move handle 456, body 464, and legs 480 relative to each other. For instance, and without limitation, operator may fold carriage 400 for compactness by folding hinge 444, which collapses carriage 400. For example, body 464 may be moved toward legs 480 when hinge is folded and thus to fold carriage 100 into a folded position. In another example, handle 456 may be moved toward legs 480, such as toward rear legs, when hinge is folded and thus to fold carriage 100 into a folded position. In one or more embodiments, handle 456 may include a handle cover 612. Cover 612 may wrap about an area of handle 612 where a user is likely to grip handle 456 during operation of carriage 400. In some embodiments, cover may be integrated into handle 456. In other embodiments, cover 612 may be a removeable or replaceable component of handle 456. Cover 612 may be made from various materials, such as a cloth, leather, polymeric material, carbon fiber, silicon, and the like. Cover 612 may have apertures disposed therein so that components, such as operator sensor, LEDs, imaging device, and the like, may still function properly when cover 612 is position on handle 456.

In one or more embodiments, handle 456 may further include an operating switch 632. Operating switch 632 may allow for selection of one or more preconfigured motions on carriage 100. In some cases, controller 140 may contain one or more preconfigured motions wherein each configured motion contains a set of commands that dictate to motor that dictate motions. In one or more embodiments, the preconfigured motions may include commands to move carriage forward and backward a predetermined distance in order to mimic a 'rocking' motion. In one or more, embodiments, selection of operating switch 632 may include a request for carriage to automatically move through the use of operator sensor 132 and/or any other sensors as described in this disclosure. In one or more embodiments, selection of operating switch 632 may signify to controller that carriage should not automatically move wherein an operator may manually operate carriage 100. In one or more embodiments, operating switch 632 may include a push button, a toggle switch, a slide switch, a rotatory switch and/or any other input that may indicate interaction of an operator with operating switch 632. In one or more embodiments, selection of operating switch 632 may signify to controller 140 that the operator desires to move carriage 100 autonomously. As a result, carriage 100 may receive one or more inputs from operator sensor 132, wherein carriage may automatically move, relative to operator, without operator needing to directly contact carriage 100 to guide or propel carriage 100. If operator is determined by controller 140 to be outside of the predetermined threshold based on received data (e.g., data related to operator characteristic) from operator sensor 132, then carriage may, for example, slow or stop using brake 152. In one or more embodiments, a first selection or interaction of operating switch may stop autonomous movement of carriage 100 and instead indicate a 'rocking' feature wherein carriage 100 is configured to move back and forth a predetermined distance to mimic a 'rocking' motion. In one or more embodiments, a second selection and/or interaction of operating switch 632 may stop the 'rocking' feature and allow for manual operation of carriage 100 wherein carriage 100 can only be moved through physical exertion of carriage 100 by an operator. In one or more embodiments, a third selection of carriage 100 may indicate autonomous movement of carriage 100 wherein carriage 100 may use one or more operating sensors 132 to control movement of carriage 100. In one or more embodiments, carriage may include an audio-output device such as a speaker, wherein selection of a speaker may be configured to play one or more preselected sounds. For example, during a 'rocking' motion, carriage may be configured to emit one or more soothing sounds a child, to comfort the child during the rocking motion. In one or more embodiments, the rocking motion may be used to calm a child or to put them to sleep wherein audio-output device may facilitate the calming or sleeping of the child.

In one or more embodiments, handle 456 may include one or more vibrational elements 636 to provide haptic feedback to an operator during motion of carriage 100. In one or more embodiments controller 104 may detect the presence of an operator through load cell sensor 608 wherein gripping of handle 456 may trigger an input from load cell sensor 608 that an operator is present and/or gripping handle 456. In one or more embodiments, vibrational element 636 may include actuators and/or haptic actuators that are configured to provide sensations to a user in contact with vibrational element 636. In one or more embodiments, the actuators may include but are not limited to linear resonant actuators (LRA), eccentric rotating mass motors, Piezo haptic actuators, thermal haptic actuators, solenoid haptic actuators, ultrasonic transducers, or sensors and the like. In one or more embodiments, controller 140 may be configured to provide a physical response through vibrational element 636. "Physical response" for the purposes of this disclosure may include any movement of vibrational element 636 that may be sensed by an operator in contact with vibrational element 636. This may include vibrations generated as a result of operation of one or more haptic actuators. In one or more embodiments, controller may be configured to provide a physical response through vibrational element 636 based on the presence of operator through load cell sensor 608. In one or more embodiments, controller 104 may be configured to provide a physical response in response to an environmental characteristic and/or an operator characteristic. For example, brake 152 may be engaged if environmental sensor 124 detects obstacle 128 of a surrounding environment, such as a hazard or obstacle along support surface. As a result, controller 140 may be configured to provide a physical response in order to alert the operator of the obstacle. In one or more embodiments, controller 104 may be configured to provide a particular level of physical response through vibrational element. The level of physical response may be measured in time wherein a longer physical response may indicate a higher level. In one or more embodiments, the level of physical response may further include the intensity of the vibrations provided by vibrational element 636. In one or more embodiments, the intensity of the vibrations may be changed through a change in voltage, a change in frequency, a change in pulse width, and the like. In one or more embodiments, vibrational element may include more than one haptic actuator wherein the user of more than one haptic actuator may be used to control the level of physical response. For example, use of one haptic actuator may indicate a low level of physical response whereas the use of 3 haptic actuators may provide a higher level of physical response. In one or more embodiments, the level of physical response may be determined by the particular environmental characteristic and/or an operator characteristic. For example, an environmental characteristic such as an obstacle may provide a high level of physical response wherein an operator may be put on alert that a potentially harmful obstacle may be in the way, whereas another environmental characteristic such as the slowing of carriage may indicate a lower level of response wherein an operator is put on notice that carriage may be slowing down. In one or more embodiments, vibrational element 636 may be located beneath cover 612 wherein vibrational element 636 may still be configured to provide a physical response through cover 612. In one or more embodiments, vibrational element 636 may be situated near a portion of handle 456 that may be gripped by the operator in order to provide a physical response to the operator.

In one or more embodiments, handle 456 may include a joint cover 640 that may provide for separation between first member 628 and a portion of handle 456 configured to be gripped. In one or more embodiments, joint cover 640 may prevent a portion of handle 456 from retracting into second member 624. In one or more embodiments, joint cover 640 may provide for concealment of a connection between first member 628 and handle 456. In one or more embodiments, joint cover 640 may provide for concealment of one or more devices on handle 456 such as but not limited to wiring, load sensor cell 608, vibrational element 636 and the like. In one or more embodiments, joint cover may provide for a casing that may house one or more devices and/or components on handle 456. In one or more embodiments, joint cover may allow for placement of LED slots 620 on handle 456. In one or more embodiments, joint cover 456 and LED slots 620 may be substantially flush with one another. In one or more embodiments, joint cover 640 may allow for a section that may be gripped by an operator. In an embodiment, a gripping of joint cover 640 may trigger a response from load sensor cell 608. In an embodiment, joint cover 640 may provide for a wider range of load sensor cell wherein a gripping or compression of joint cover 640 may trigger a response from load cell response 608. In one or more embodiments, cover 612 may be located on joint cover 640 wherein handle cover 612 may contain material suitable for gripping whereas joint cover 640 may include a material suitable to provide structural stability. For example, cover 612 may include a compressible, pliable material, such as foam, leather, silicone and the like, wherein gripping of cover 612 may provide for ergonomic handling of carriage 100. However, joint cover 640 may include a rigid non pliable material such as plastic that may be used to encase one or more components of carriage 100 and prevent damage of the components. In one or more embodiments, cover 612 and/or joint cover 640 may provide for reduced sensitivity of load cell 608. In an embodiment, joint cover 640 and/or cover 608 may reduce the density of joint cell 608 by providing a barrier between load cell and an operator. In an embodiment, joint cover 640 and/or cover 612 may allow for increased range of load cell 608 wherein a compression of one or more areas on joint cover and/or cover 612 may result in compression of load cell 608.

Figure 7A:
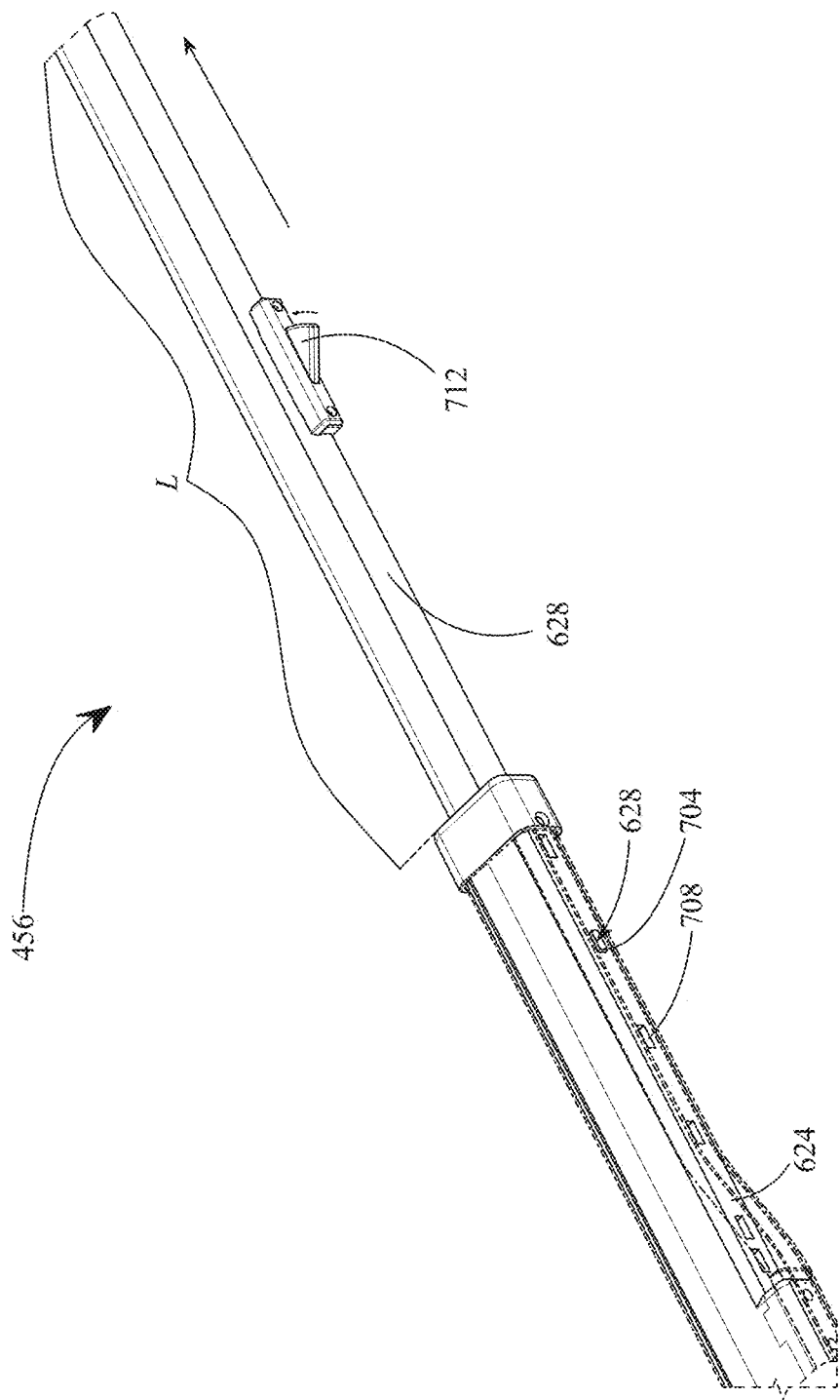
Figure 7B:
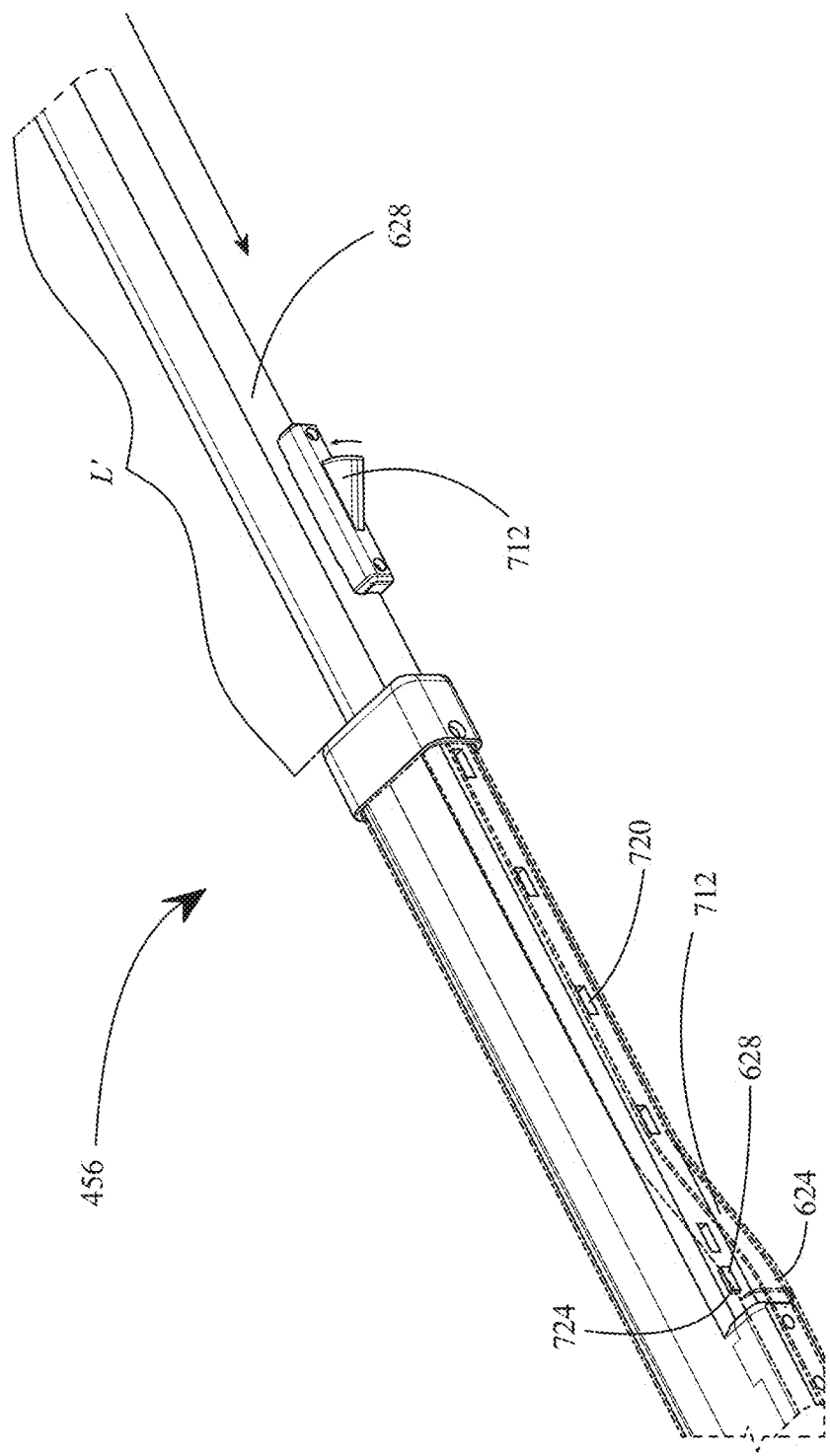

Referring now to FIGS. 7A-7C, adjustment of a length L of handle 456 is shown in accordance with one or more embodiments of the present disclosure. Handle 456 may be adjusted so that handle 456 is extended to various lengths. Handle 456 may be in an extended position with a length of L, as shown in FIG. 7A, or handle 456 may be in a retracted position with a lesser length of L', as shown in FIG. 7B. Handle 456 may be adjusted in length based on operator's preference or if operator desires to fold carriage 400. In some embodiments, extended position may include a plurality of extended positions of various distances. Handle 456 may be moved and positioned at various incremental distances in the extended position. For example, and without limitation, a first member 628 of handle 456 may be moved relative to a second member 624 of handle 456. Second member 624 may be attached, for example, fixedly attached, to hinge 444 at, for example, a proximal end of second member 624 while a distal end of second member 624 may receive at least a portion of first member 628. First member 628 may be movably attached to second member 624. For example, and without limitation, a pin of first member 628 may engage a hole 708 of second member 624 to fix first member 628 relative to second member 624. First member 628 may include a cross-sectional area that is smaller than a cross-sectional area of second member 624 so that a portion of first member 628 may be disposed within lumen 616 of second member 624, and so that portion of first member 628 disposed within lumen 616 (as shown in FIGS. 6B and 7C) of second member 624 is concentric with second member 624. Upon an actuation of an actuator, such as actuator 712 positioned on first member 628, first member 628 may be moved relative to second member 624 by incremental distance created by telescoping holes 708 of first member 628, where a pin 704 of first member 628 may engage a telescoping hole positioned at a desired distance. Actuation of actuator 712 may result in a retraction of pin 704 from a current telescoping hole 708, which created a current length L of handle 456, and a disengagement between first member 628 and second member 628 so that first member 628 may be moved relative to second member 624 and a new hole 708 may be selected by an operator to create an engagement between first member 628 and second member 624 at a new length L' of handle 456.

In other embodiments, handle 456 may be adjusted by continual distances. For example, and without limitation, handle 456 may be adjusted using a continual, longitudinal track that extends along an inner surface of handle 456 and within lumen 616. Actuator 712 may use wires to communicate with controller 440.

Figure 8A:
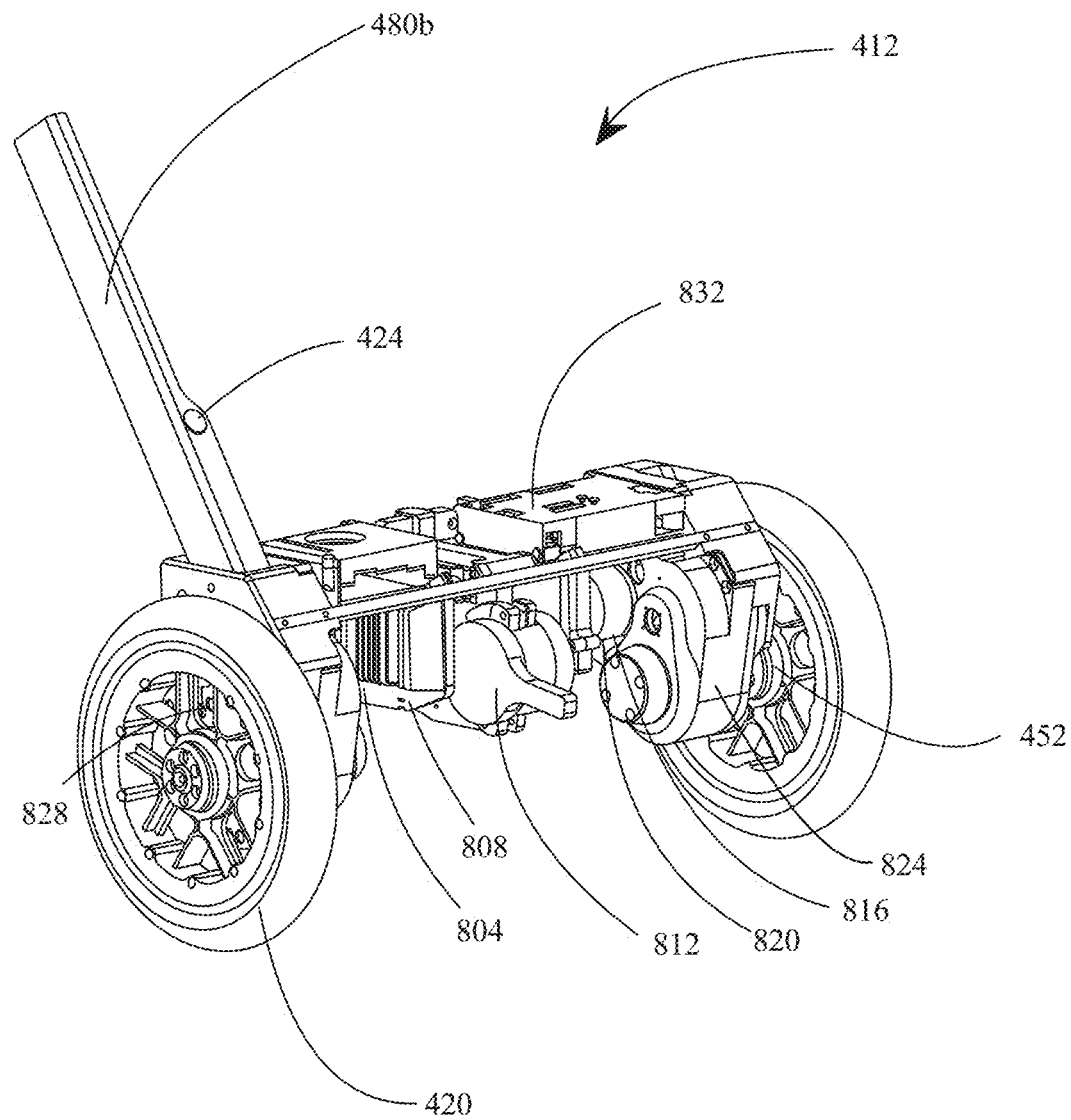
FIGS. 8A and 8B are illustrations of an exemplary embodiment of a drivetrain of carriage in accordance with one or more embodiments of the present disclosure.
Figure 8B:
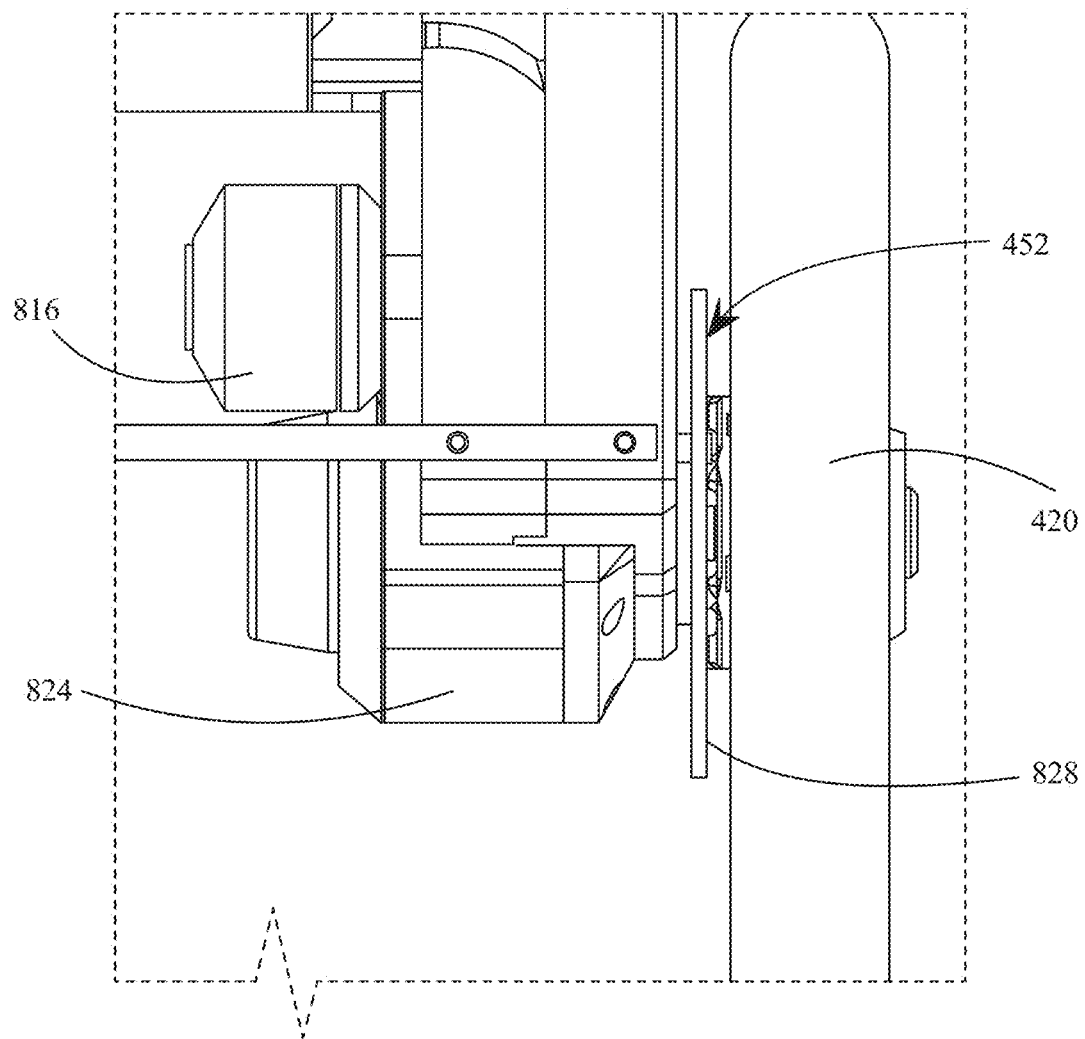

Now referring to FIGS. 8A and 8B, an exemplary embodiment of drive motor 412 of carriage 400 is shown in accordance with one or more embodiments of the present disclosure. In some embodiments, drive motor may include drive motor 112. In some embodiments, and as previously mentioned in this disclosure, drive motor 412 may include any of a DC motor, a stepper motor, a brushless motor, and a servo motor, or the like. Alternatively or additionally, in some embodiments, drive motor 412 may include a pneumatic motor or a hydraulic motor.

In one or more embodiments, drive motor 412 includes a power distribution 804, a servo-motor brake 808, a user actuated pin brake 812, a motor 816, a motor brake 820, a gearbox 824, a disk brake 828, and computing units 832. In one or more embodiments, drive motor 412 may be operatively coupled to at least a drivetrain 416, which may be attached to drive wheels 420. In some embodiments, drivetrain 416 may include one or more of a gear, a belt, a chain, a pulley, a shaft, a hydraulic system, a pneumatic system, a friction drive, and the like. In one or more embodiments, drivetrain 116 may be further operatively connected to at least drive wheel 420. Drive wheel 420 may include any wheel configured to contact support surface. For example, and without limitation any of a rim, a tire, or a pneumatic tire. Drive wheel 420 may be made from various materials, such as metal alloys, polymers, carbon fiber, fiberglass, and the like. In some embodiments, wheel 420 may be an inflatable wheel. In other embodiments, drive wheel may be a solid wheel, such as a monolithic component. In other components, wheel may be made from a structure or rigid mesh having a toroidal shape. In some cases, drive wheel 420 may be a hubless wheel (shown in FIGS. 1A and 1B); the hubless wheel may be operatively coupled to drivetrain 416 by way of a component having a rotational axis that is parallel and non-concentric to the hubless wheel's rotational axis. In other embodiments, drive wheel 420 may include a hub, as shown in FIG. 8A. Drive wheel 420 may be operatively coupled to drivetrain 416 by way of a component having a rotational axis parallel and concentric to the rotational axis of wheel 420 and corresponding hub. In some embodiments, drive wheel 420 may be rotatably affixed to frame 408; for example, the drive wheel may be attached to the frame 408, while still being able to rotate. Drive wheel 420 may be affixed to frame 408 using one or more bearings, for example ball bearings, roller bearings, crossed roller bearings, duplexed or multiplexed bearings, and the like. Drive wheel 420 may be rotated by drive motor 412 via drivetrain 416.

Figure 9A:
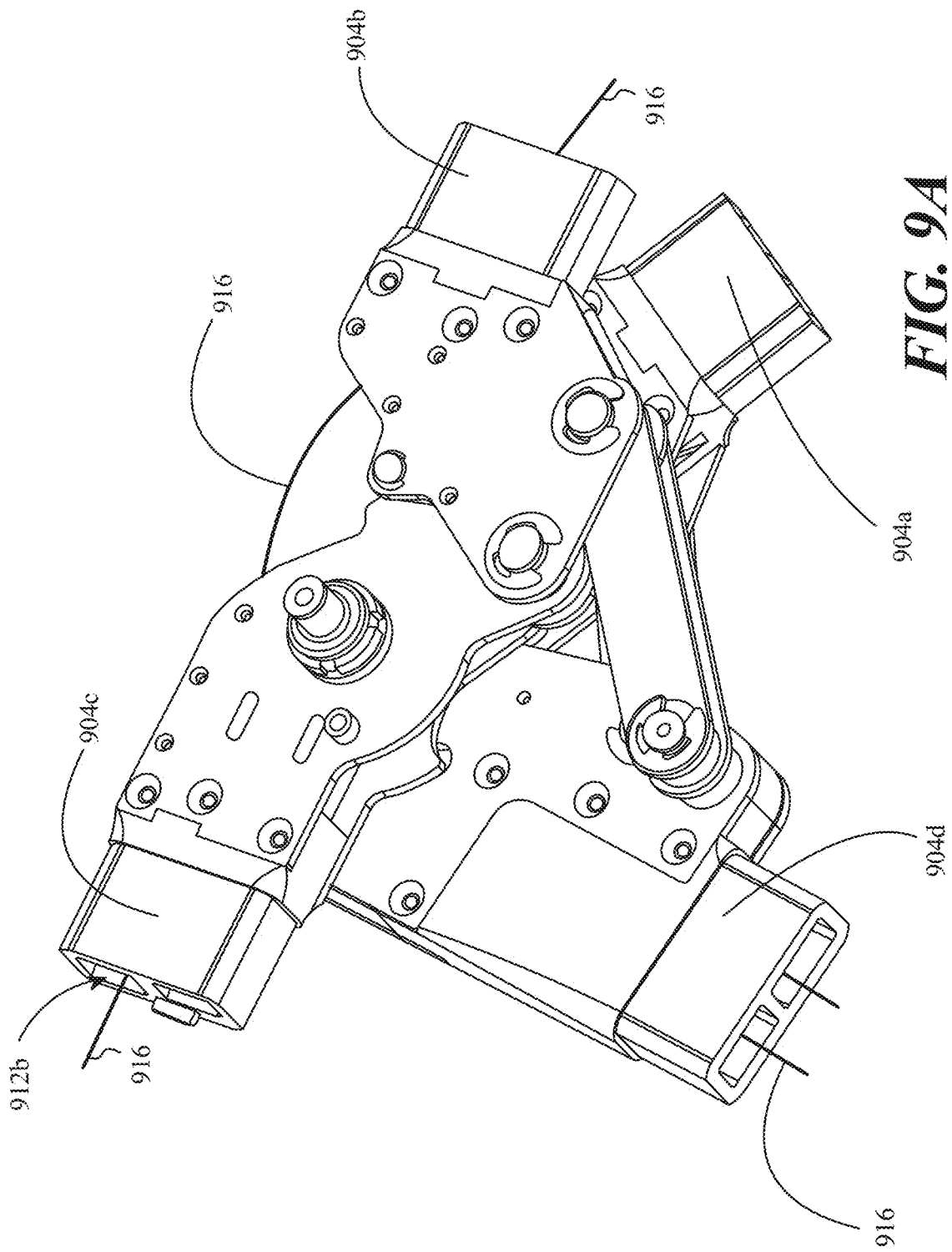
FIGS. 9A-9C are illustrations of an exemplary embodiment of a hinge in accordance with one or more embodiments of the present disclosure.
Figure 9B:
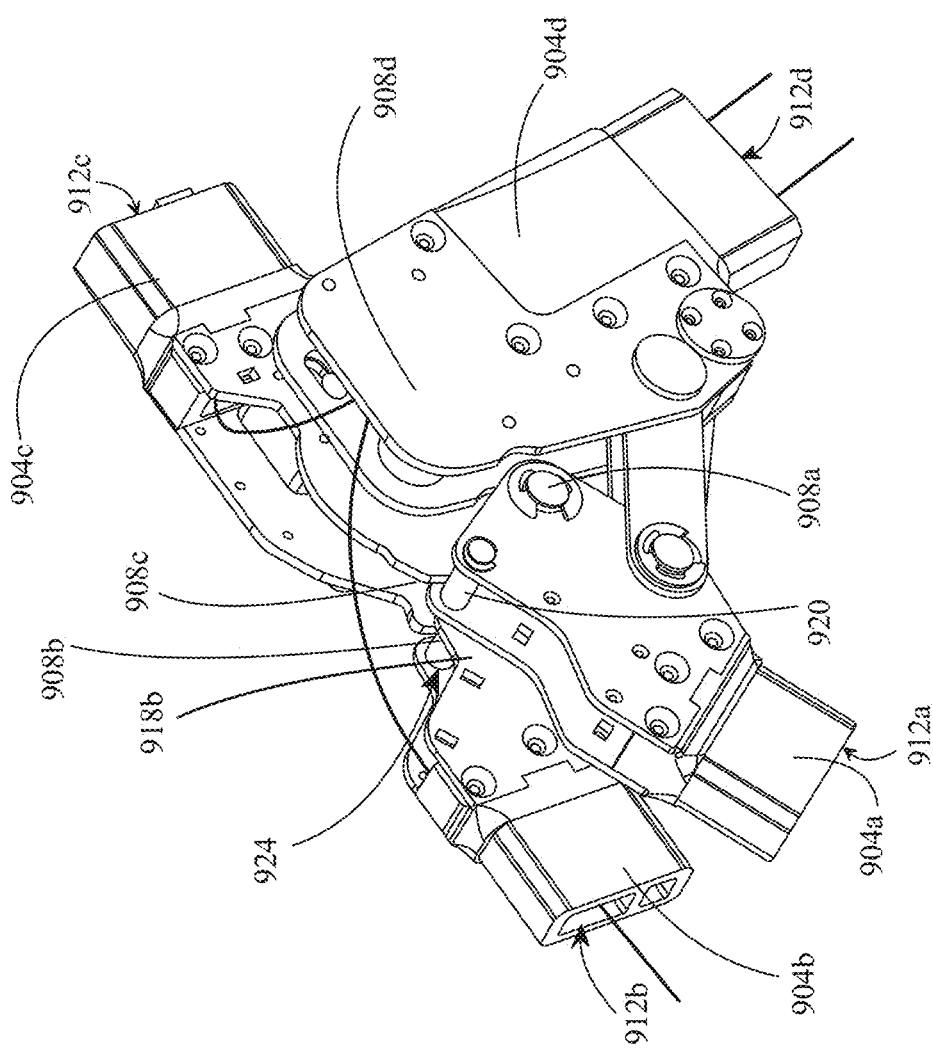
Figure 9C:
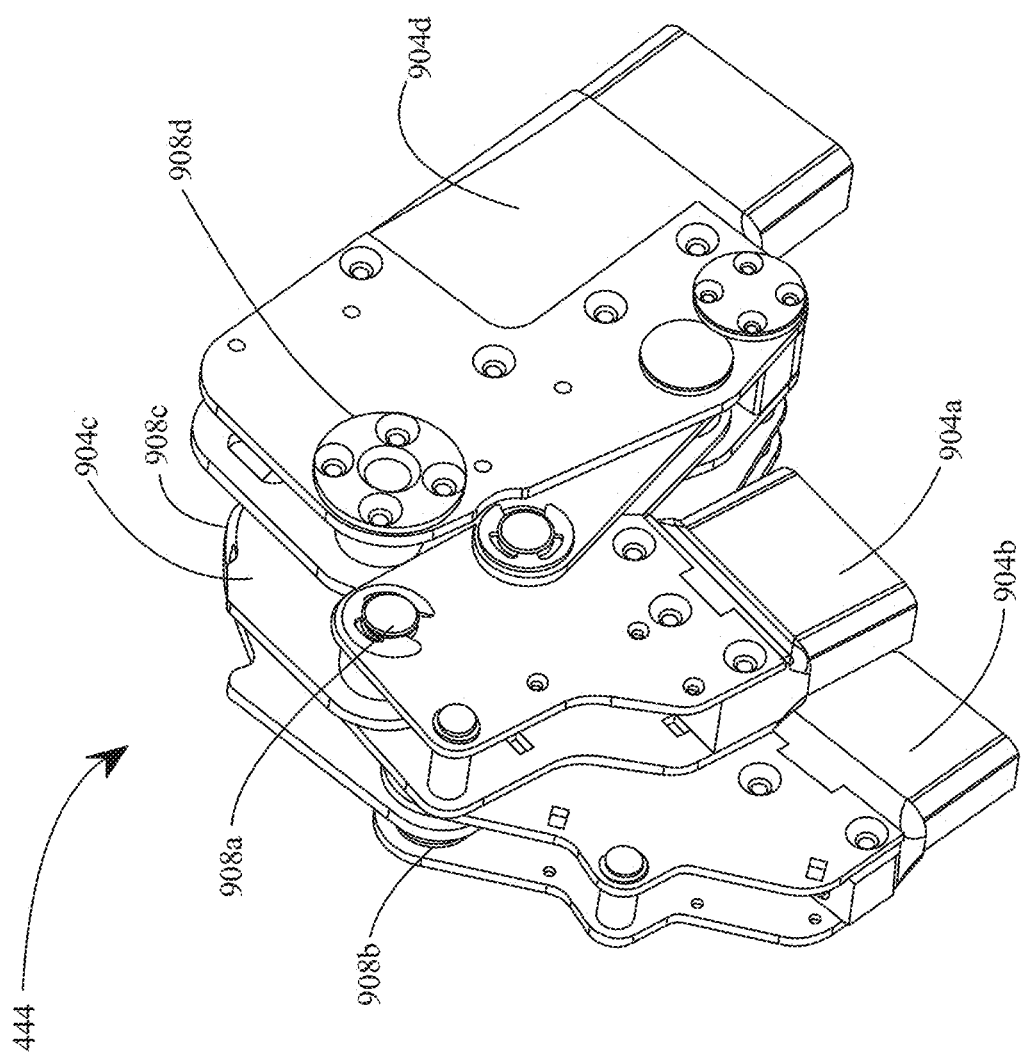

Now referring to FIGS. 9A-9C, an exemplary embodiment of hinge 444 of frame 408 is shown in accordance with one or more embodiments of the present disclosure. FIGS. 9A and 9B show hinge 444 in an expanded position, and FIG. 9C shows hinge 444 in a collapsed position. Hinge 444 is configured to expand or fold frame 408. In one or more embodiments, folding frame 408 allows for carriage 400 to become more compact and be stored or transported more conveniently. In some embodiments, hinge 444 may include a plurality of rigid links 904a, 904b, 904c, and 904d. In one or more embodiments, each link 904a-d may include a corresponding joint 908a, 908b, 908c, and 908d, respectively, that allows each link 904a-d to move independently relative to each other. In some cases, each link 904a-d may include a corresponding wireway 912a, 912b, 912c, and 912d, respectively, in which one or more wires 916 may be routed therethrough. In some embodiments, hinge 444 may be configured to allow wires 916 to be routed through hinge 444, while in either a folded or unfolded position. One or more wires 916 may traverse through wireways 912a-d and into a hollow interior of attached portions of frame 408. More specifically, a hollow interior of each arm, such as body 464, handle 456, front legs 480a, or rear legs 480b, of frame 408 is configured to route at least a wire from a first arm of frame 408 to a second arm of frame 408. In a non-limiting embodiment, and without limitation, wire 916 may traverse through wireway 912b and into a hollow interior of an arm, such as body 464. Wire 916 may be disposed within hollow interior of body 464 to provide a communicative connection between one or more components of carriage 400. For example, and without limitation, a hollow interior, or lumen, of body 464 allows for wire 916 to, for example, connect environmental sensors 424 disposed within or attached to body 464 of frame 408 with, for example, each other or controller 440. For example, and without limitation, wire 916 may travel from controller 440 through a hollow portion of leg 480b into wireway 912d, out of wireway 912b, and through body 912b to environmental sensors 424. Similarly, wires 916 may be disposed within and traverse through handle 456 to, for example, provide an communicative connection between an actuator of handle 456 and a telescoping feature of handle 456, as previously discussed in this disclosure.

In some embodiments, frame 408 may include one or more portions that meet at hinge 444. For instance, hinge 444 may be located at a junction of a proximal end for each of front leg 480a, rear leg 480b, body 464, and handle 456. For example, and without limitation, a proximal end of body 464 may be attached to a first link 904a, a proximal end of front leg 480a may attach to a second link 904b, a proximal end of handle 456, such as a proximal end of a second portion of handle 456, may attach to a third link 904c, and a proximal end of rear leg 480b may attached to a fourth link 904d. In one or more embodiments, each proximal end may attach to a corresponding link 904a-d, which may be at least partially disposed within a lumen of each of proximal ends of body, handle, front leg, and rear leg. Wires 916 extending through wireways 912a-d may also traverse through lumens of frame 408. In some cases, each link 904a-d may be fixedly fastened to a corresponding proximal end using various fastening components, such as, but not limited to screws, buttons, pins, fasteners, adhesive, and the like.

In one or more embodiments, each link 904a-d may be moveable relative to other links 904a-d using joints 908a-d. In some embodiments, joints 908a-d may include rotational joints. For example, and without limitation, joints 908a-d may include pins 920 disposed at least partially through bores 924 of links 904a-d. Joints 908a-d may provide pivot points that each link 904a-d may rotate about. For example, and without limitation, links 904a-d may rotate about a longitudinal axis of corresponding pin 920. In other embodiments, joints 908a-d may include flexure joints. In other embodiments, joints 908a-d include knuckle joints. In some cases, hinge 444 may include a locking mechanism, such as a pin or a lockable lever arm, that is configured to prevent operation or movement of hinge 444, thereby preventing frame from folding at an undesirable time. In some embodiments, a hinge motor may be operatively coupled to links 904a-d, for example, by way of a drive gear, such that operating the hinge motor causes hinge 444 to fold frame 408 or expand frame 408 upon receiving a command signal from controller 440 or an actuator communicatively connected to hinge 444.

Figure 10A:
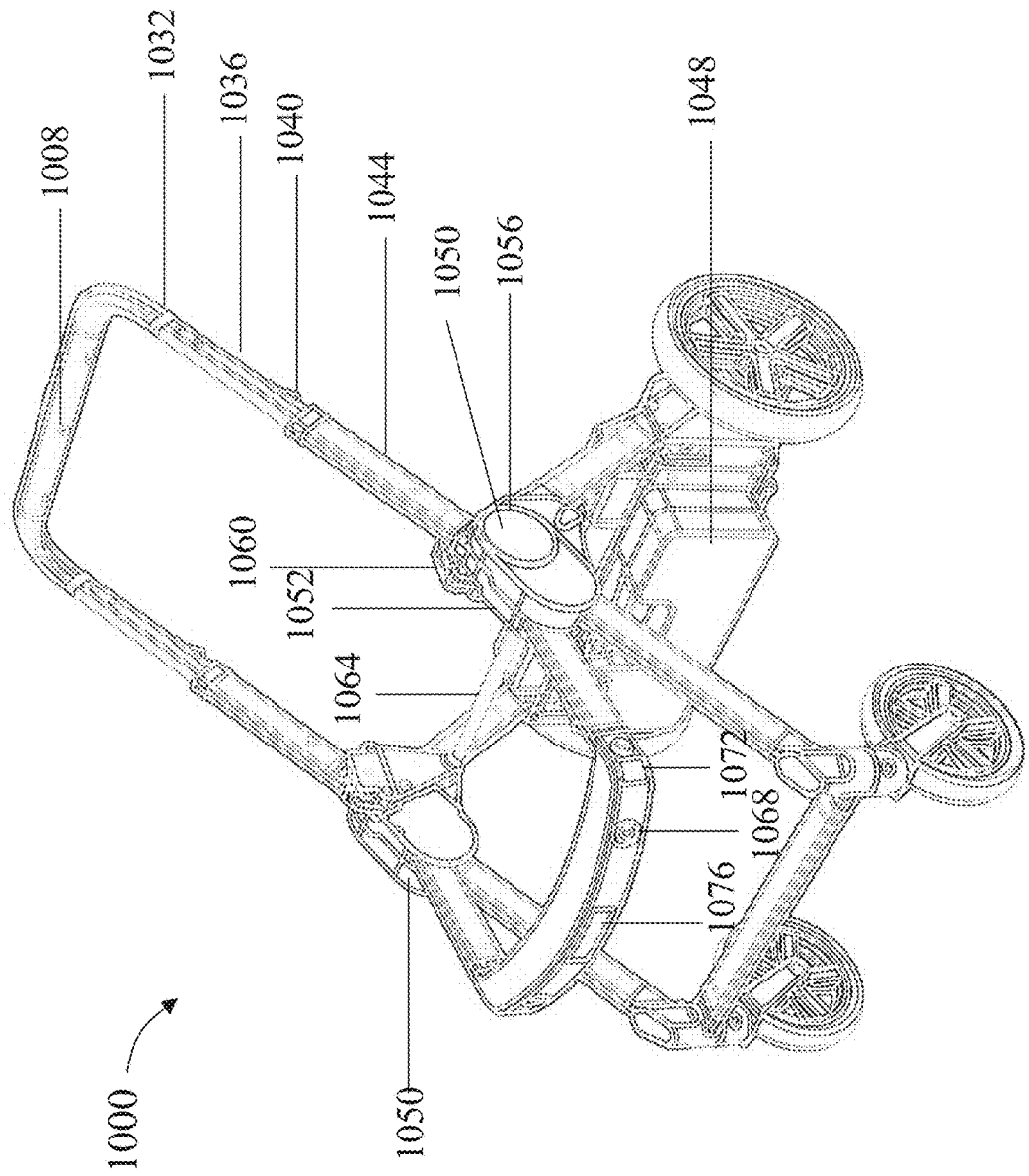
FIGS. 10A-10B is a schematic diagram of an exemplary embodiment of a carriage.
Figure 10B:
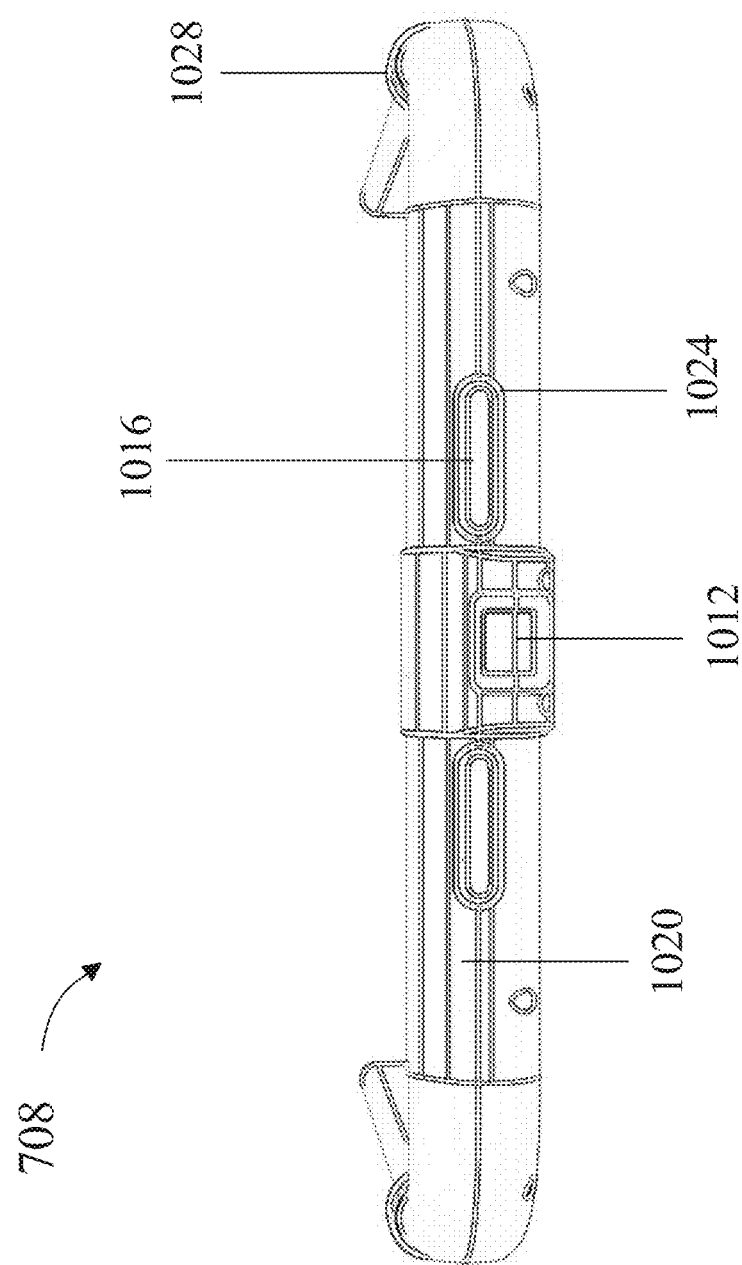

Now referring to FIGS. 10A-B, a schematic diagram of an exemplary embodiment of a carriage structure 1000 for guided autonomous locomotion is illustrated. Carriage structure 1000 may include components or variations related to carriage structure 100. Carriage structure 1000 may include a handle bar 1004. A "handle bar," as used herein, is a component used to steer an apparatus. Handle bar 1004 may include force sensing technology as well as visual and haptic feedback sensing capabilities as described above. "Haptic feedback," also known as tactile feedback or haptics, is a technology that uses physical sensations or movements to provide users with a sense of touch or feedback in response to their interactions with electronic devices or virtual environments. For example, vibrations and force feedback for alerting a user as described above. In some embodiments, handlebar may be covered by leather, fabric, plastic, or any other protective material. Handle bar 1004 may include a button 1008. In one or more embodiments, button 1008 may be consistent with operating switch 632 as described in reference to FIG. 6. Button 1008 may be used to toggle different features of carriage structure 1000 such a push-assist mode or any other functional mode as described herein. In some embodiments a functional mode may include a rocking mode, wherein carriage 1000 may include actuators configured to rock or sway a seat locked into carriage 1000. In some embodiments, compliant mechanisms, such as springs may be used to reciprocate the motion provided by an actuator in order to help provide the rocking motion. In some embodiments, rocking mode may cause stroller to move forward and backward, solely and repeatedly using drive motor 412. Examples may include, a foot activated brake, a one-handed folding mechanism, adjustable handle bar 1004, self-propulsion (built-in motors or mechanisms that can move the carriage structure 1000 forward with a simple push or touch of a button, reducing the physical effort required to push carriage structure 1000), and the like.

With continued reference to FIGS. 10A-B, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIGS. 10A-B, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIGS. 10A-B, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIGS. 10A-B, in some cases, actuator may include an electric actuator. Electric actuator may include any electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIGS. 10A-B, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIGS. 10A-B, handle bar 1004 may include a rear camera window 1012. Rear camera window 1012 may enable carriage structure 1000 to recognize who the user is via machine vision and machine learning as described above. Rear camera window 1012 may allow a rear camera to aid computing device 104 in locking carriage structure 1000 when an unauthorized user tries to use the stroller. For example, the wheels of carriage 1000 may locked or prevented from moving using a manually actuable and/or a programmatically actuable pin parking break as described further below.

Still referring to FIGS. 10A-B, handle bar 1004 may include an LED window 1016, LED window cover 1024, internal or external vibration motors 1020 for haptic feedback. An "LED window," as used herein, is a compartment integrating LED lights. An "LED window cover," as used herein, is a protective cover placed over an LED window. Handle bar 1004 may include a joint cover 1028 that covers the connection between a handlebar telescoping tube and a handlebar grip in order to enable force sensing capabilities while reducing unwanted sensitivity.

Still referring to FIGS. 10A-B, handle bar 1004 may include a telescoping mechanism to extend and retract the length of handle bar 1004 for ease of use for both taller and shorter users. A "telescoping mechanism," also known as a telescopic mechanism, refers to a system that allows one part to slide or extend into another, similar to the way a telescope's tubes slide in and out to adjust its length. The telescoping mechanism may include a grip cover 1032 covering the extension of tubes and/or material such as inner tubes 1036 that may be configured to extend inward and outwards. A "grip cover," as used herein, is a protective accessory designed to be placed over an object to provide grip to a user. The telescoping mechanism may include outer tubes 1044 which may, in some position, house the telescoped areas of the inner tube 1036. Tigger buttons 1040 may be located on either inner tube, wherein trigger buttons 1040 enable not only the telescoping, and/or the folding of the carriage structure 1000. Additionally, carriage structure 1000 may include a removable battery 1048. Battery 1048 may include a battery management system that is attached a to a rear drive train as described further below.

Still referring to FIGS. 10A-B, carriage structure 1000 may include two main joints 1050 that folds the front leg, rear leg, sensor frame, and handlebar in one combined action. The main joints 1050 may include configurations in reference to hinge 300. The main joints 1050 may include an inner cover 1052 wherein an inner plate comes out to fill the gaps created by the legs, sensor frame, and handlebar of carriage structure 1000. The main joints 1050 may include an outer cover 1056. The main joints 1050 may include an adaptive seat connector 1060 configured to connect a bassinet, seat, or other attachment to carriage structure 1000. An "adaptive seat connector," is a type of mechanism or component used to securely attach a seating device to a base. The main joint may include a lift bar 1064 configured to allow carriage structure 1000 to be lifted when folded. A "lift bar," for the purposes of this disclosure is a component that allows an object to be lifted or carried easily. In some embodiments, lift bar 1064 may include a detachable lift bar. A "detachable lift bar," as used herein, is a lift bar that is able to be detached from the object without damaging said object. A detachable lift bar is detachable, as in, the detachable lift bar may be removed from carriage structure 1000. For example, detachable lift bar may be able to be removed by unscrewing screws, pushing in tabs, undoing fasteners, and the like.

Still referring to FIGS. 10A-B, carriage structure 1000 may include a sensor unit further including a microcontroller as well as multiple ultrasonic sensors 1068 and cameras. The sensor included in the sensor unit may function similarly to the sensors as described for carriage structure 400, such as environmental sensor 116, in addition to having a configuration that improves the foldability of carriage structure 1000. The sensor unit may include an ultrasonic sensor 1068, a camera 1072, and a stereoscopic camera 1076. An "ultrasonic sensor," is a type of sensor that uses ultrasonic waves to detect the presence or distance of objects in its vicinity. Examples of ultrasonic sensor 1068 may include a Maxbotix, Parallax Ping, and the like, type of ultrasonic sensor. Examples of ultrasonic sensor 1068 may include a proximity ultrasonic sensor, distance measurement ultrasonic sensor, doppler ultrasonic sensor, and the like. A "stereoscopic camera," as used herein, is a type of camera system that is designed to capture images or videos in three dimensions.

Figure 11:
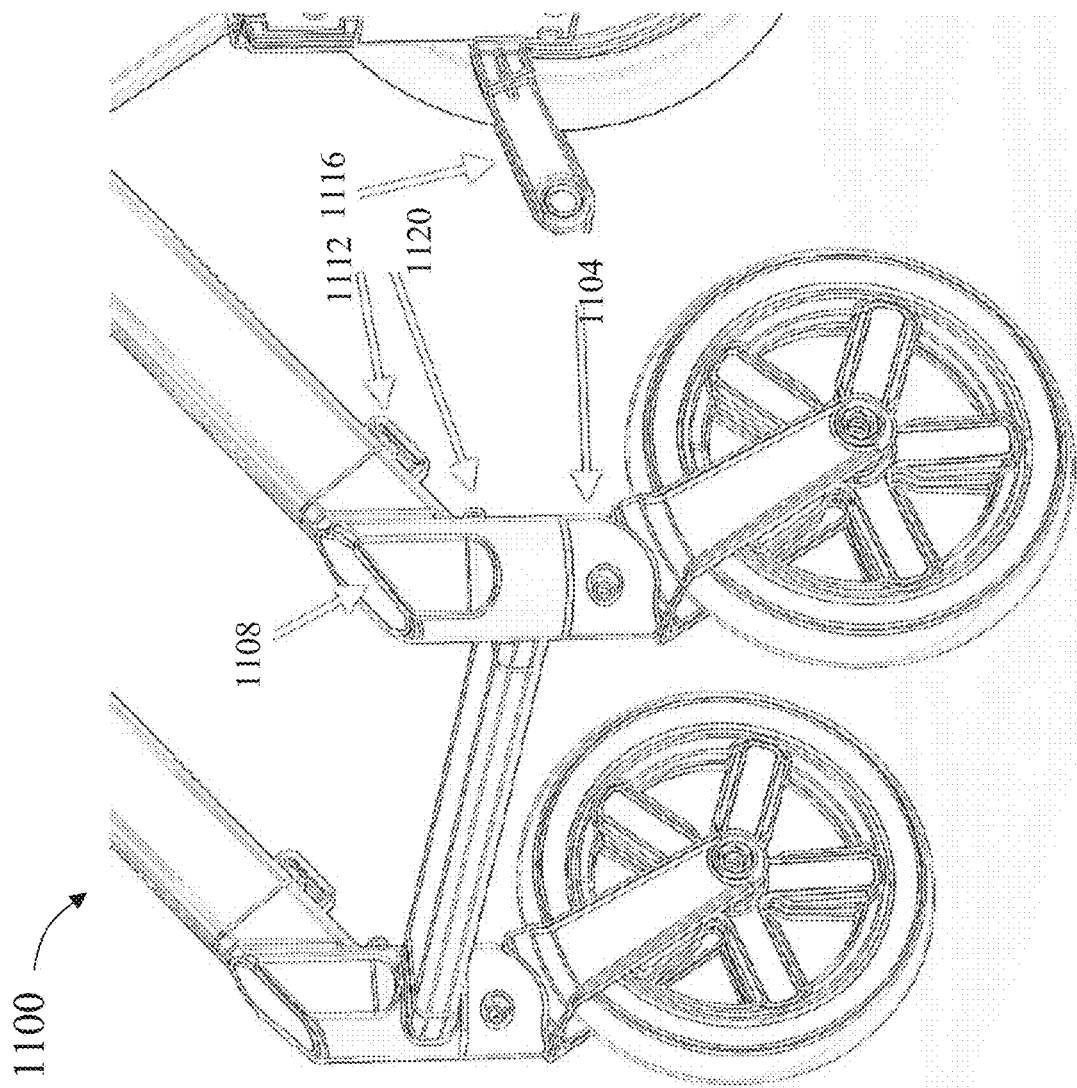
FIG. 11 is a close up view of a front caster for a carriage.

Referring now to FIG. 11, a close-up view of a front caster 1100 for carriage structure 1000 is illustrated. Front caster may include a lockable swivel 1104 with internal suspension. Locking a swivel may include a swivel caster brake or caster wheel brake to prevent rotation. Such mechanisms may include a lever or pedal that is connected to a braking system, for example, an actuable pin parking brake as described below. A "front caster," as used herein, in the wheel assembly or component located at the front of carriage structure 1000. An internal suspension may include springs, elastomeric materials, other dampening mechanisms, and the like. Front caster 1100 may include removable modular cap 1108 which may house any sensors as described above. Front caster 1100 may include basket hooks 1112. Front caster may include a folding latch 1116 to keep carriage structure 1000 locked in a folded state. Front caster may include a folding latch locking pin 1120. When in a folded state, folding latch 1116 may connect to folding latch locking pin 1120 using a hook and loop method, buttoning method, tapping method, and the like. For example, folding latch 1116 may include a strap with a component on one end configured to snap, button, or stick onto folding latch locking pin 1120.

Figure 12A:
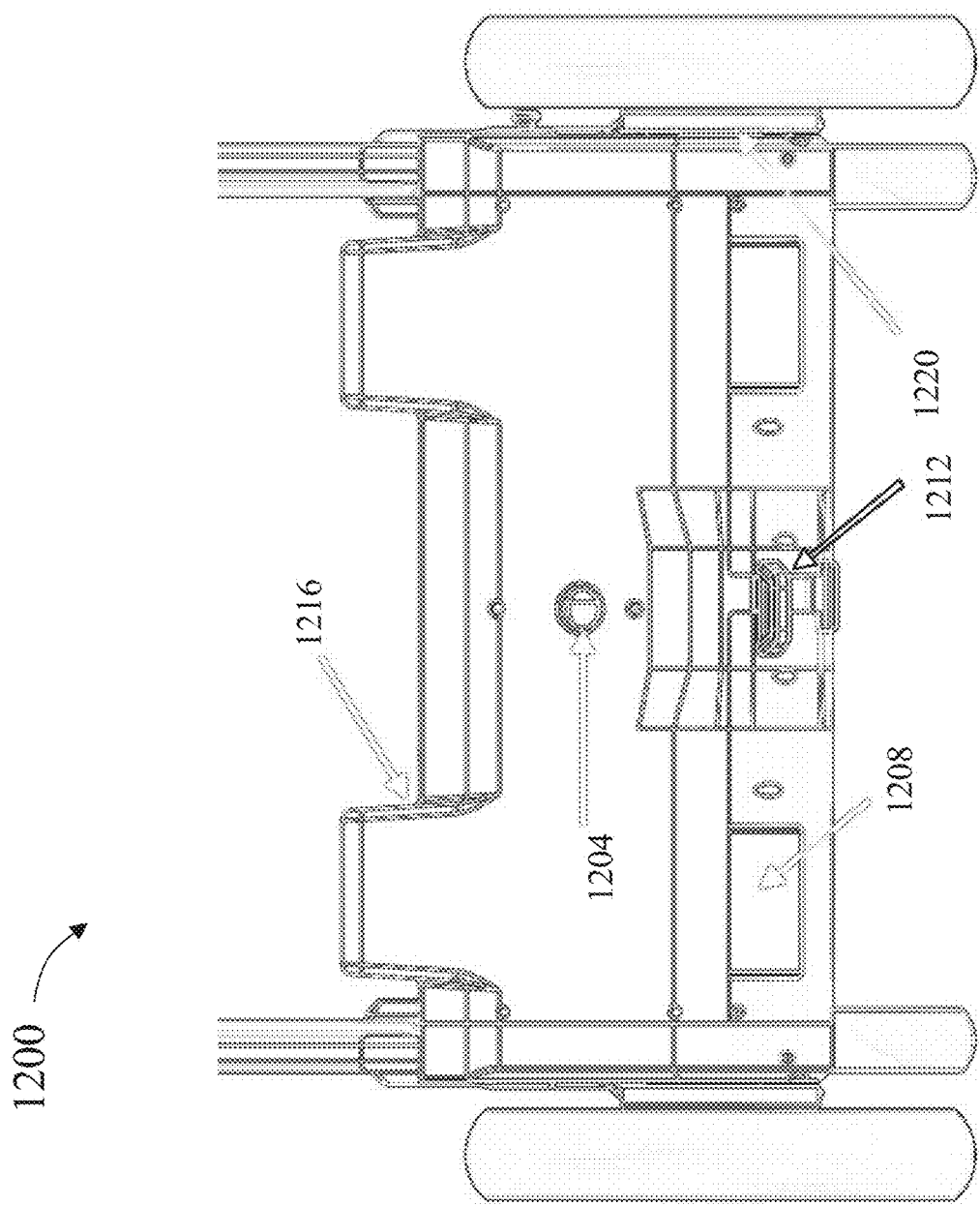
FIGS. 12A-B is a close up view of a rear drive train for a carriage.
Figure 12B:
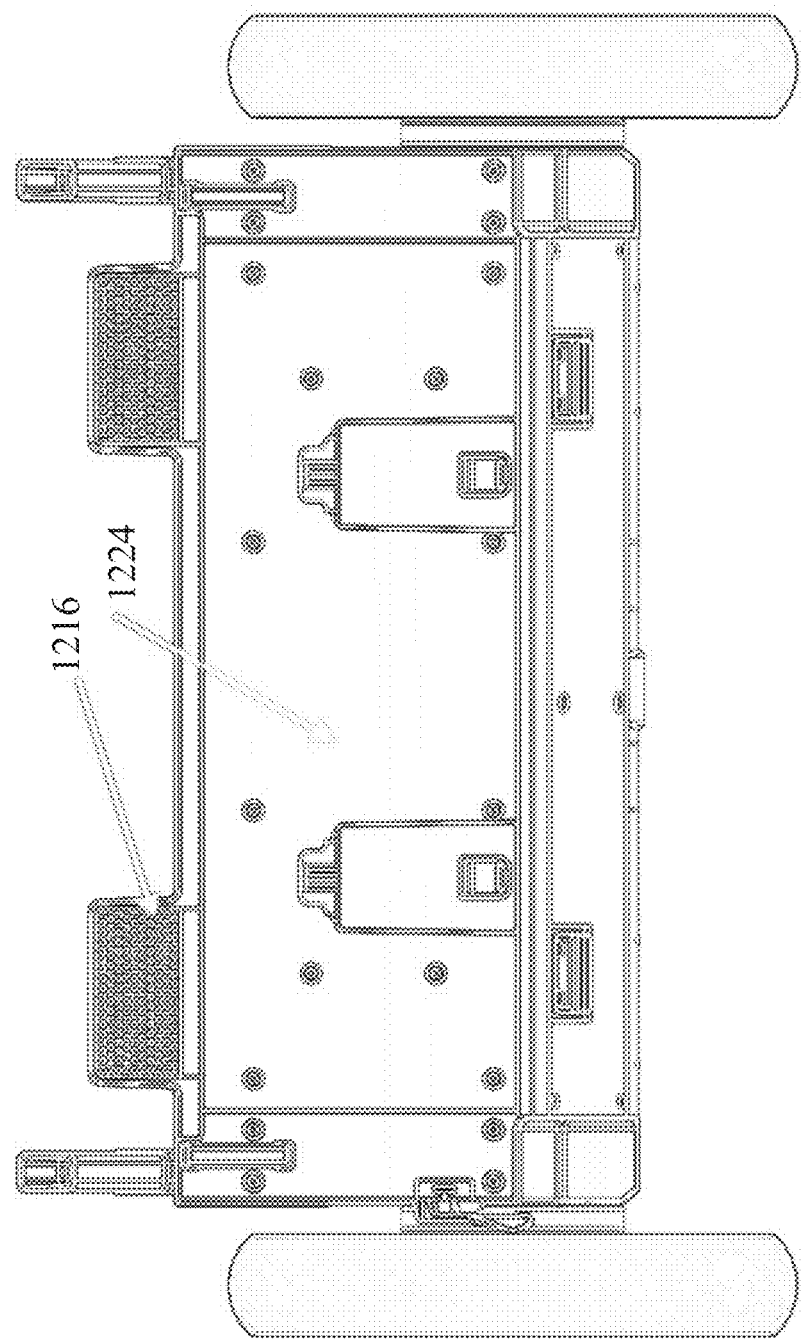

Referring now to FIGS. 12A-12B, a close-up view of a rear drive train 1200 for carriage structure 1000 is illustrated. Rear drive train 1200 may be consistent with aspects of drive motor 412 along with similar functionality. Rear drive train 1200 may include a rear ultrasonic sensor 1204. Rear drive train 1200 may include an air vent outlet 1208 for thermo-control purposes. Rear drive train 1200 may include a manually actuable and/or a programmatically actuable pin parking brake 1212. An "actuable pin parking brake," (also known as an "actuated pin parking brake") is a type of parking brake mechanism configured to secure a carriage structure 1000 or equipment in a stationary position when not in use, preventing unintentional movement. Actuable pin parking brake 1212 may include: an actuator at initiates the engagement or disengagement of the parking brake; an actuating pin (metal pin or rod) that extends or retracts when the parking brake is engaged or released; a brake Lever or pedal to engage or disengage the parking brake; and a brake release handle that allows the user to disengage the brake and release the pin, allowing carriage structure 1000 to move freely. Rear drive train 1200 may include an air intake component 1216 for thermo-control purposes. Rear drive train 1200 may include a pin brake receiving pad 1220. A "pin brake receiving pad," as used herein, is a component that an actuating pin makes contact with when a parking brake is engaged. When an actuating pin comes into contact with the receiving pad, it may create friction or apply pressure to secure the brake, preventing the wheel or object from moving. A pin brake receiving pad may be composed of material such as rubber, rubber compounds, urethane, composite materials, metallic pads, and the like. Rear drive train 1200 may include a battery receiving plate 1224. For example, battery receiving plate 1224 may be shaped in a similar to battery wherein a battery may be fit inside the compartment. In other embodiments, battery receiving plate 1224 may include devices such as straps, button, pins, hooks, screws, and the like to hold a battery in place. A "battery receiving plate," as used herein, is a compartment configured to hold a battery. Internally, rear drive train 1200 may, with reference to FIG. 4, house custom motors, custom motor controllers, microcontrollers on custom PCBs (Printed Circuit Boards), fans, speakers, GPS modules, servo motors, DCDC converters (voltage converters or voltage regulators), and the like.

Figure 13:
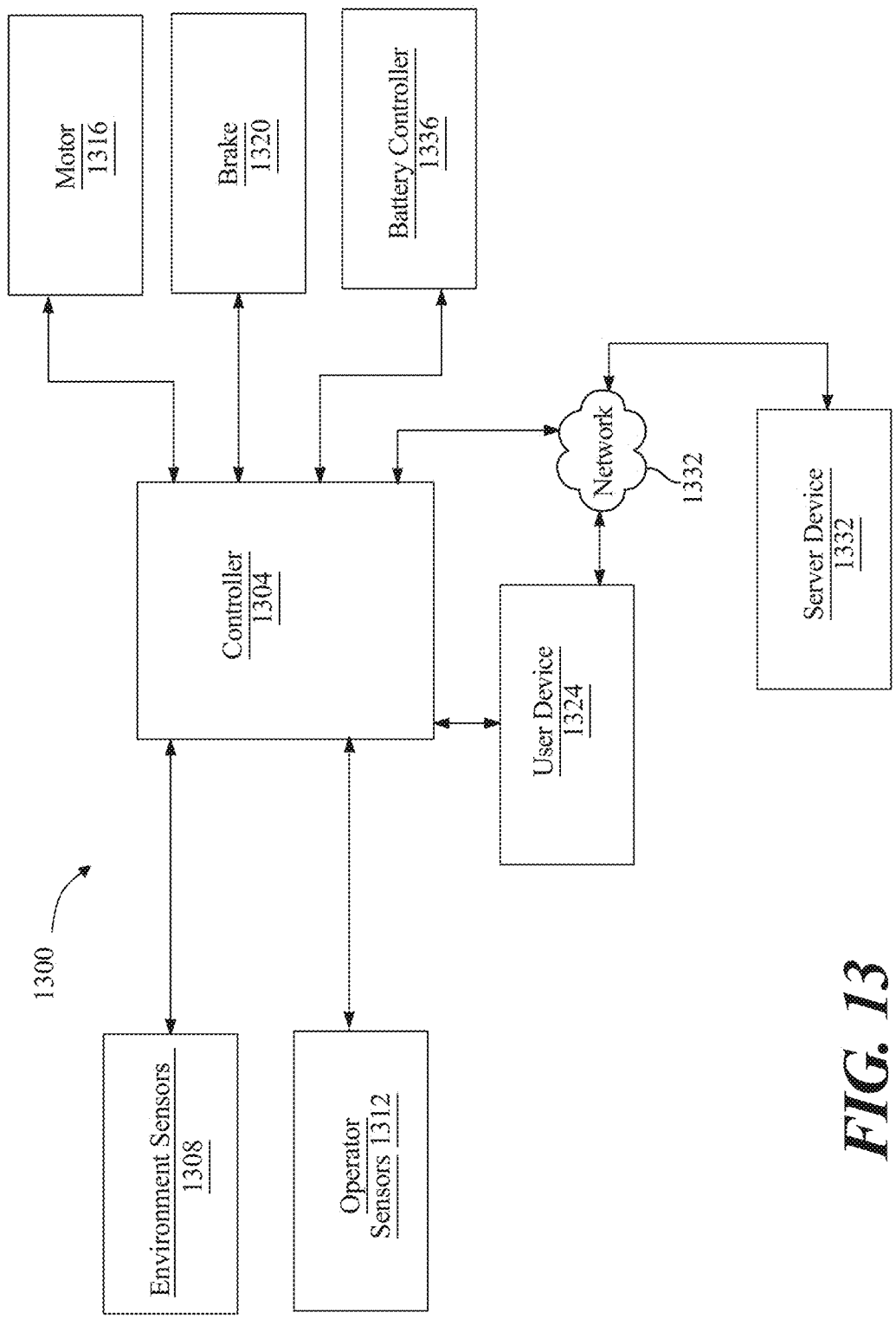
FIG. 13 is an illustration of an exemplary embodiment of a controller in accordance with one or more embodiments of the present disclosure.

Referring now to FIG. 13, an exemplary control arrangement 1300 is schematically shown in a block diagram. In some embodiments, a control arrangement 1300 may include a controller 1304. Controller 1304 may, in some cases, have a plurality of inputs and/or a plurality of outputs. Controller 1304 may include any combination of one or more hardware, firmware, and/or software components. For example, in some embodiments, controller 1304 may include one or more of a micro-controller, a field programmable gate array (FPGA), a digital signal processor (DSP), or the like, or any combination of the aforementioned hardware. Additionally or alternatively, in some embodiments, controller 1304 may include a computing device as described throughout this disclosure, for instance in reference to FIG. 6. In one or more embodiments, controller 1304 may be in communication with a memory, such as memory 1208 (shown in FIG. 15) where memory may provide instructions to controller 1304 for controller 1304 to execute, as discussed further in this disclosure. Furthermore, instructions from a memory may configured controller 1304 to be configured to execute one or more actions and/or methods described in this disclosure. In some embodiments, controller 1304 may take as input a signal from one or more environmental sensors 1308 and/or from one or more operating sensors 1312. In some embodiments, controller 1304 may output command signals to one or more drive motors 1316, one or more brakes 1320, and or electronics of compartment 134. In some embodiments, controller 1304 may be communicative with a user device 1324. Controller 1304 may be communicative with user device 1324, for instance, directly such as via Bluetooth, serial communication, ethernet communication, and the like, or indirectly, such as via one or more communication networks 1328. Additionally or alternatively, in some embodiments controller 1304 is communicative with one or more server devices 1332 by way of network 1328. In some non-limiting embodiments, controller 1304 may be configured to recognize, using one or more environmental sensors 1308, a runaway condition, which is where an operator is not near or in control of carriage 130, and substantially stop motion of carriage, for example, by way of one or more drive motors 1316 and/or one or more brakes 1320. In another non-limiting embodiment, controller 1304 may be configured to move carriage according to sensed movements of an operator. In still another non-limiting embodiment, controller 1304 may recognize an operator has stopped, for example by using methods described above, and stop carriage, for example by using one or more drive motors and/or one or more brakes, when an operator stops moving. In some embodiments, controller 1304 may communicate with a battery controller 1336. In some embodiments, a battery controller may be used to monitor an energy level representing energy stored within a battery and communicate the energy level to the controller 1336. In some cases, battery controller 1336 may sense an electrical parameter of battery; for instance, the battery controller 1336 may measure a voltage of the battery. Voltage of a battery cell, a plurality of battery cells, modules or plurality of modules may be measured. In some cases, battery controller 1336 may sense an electrical parameter by inferring or calculating the electrical parameter based on sensed electrical parameters, for instance by using Ohm's law or other relations to calculate resistance and/or impedance from detected voltage and current levels. In some cases, an electrical parameter may include signal properties such as frequency, wavelength, or amplitude of one or more components of a voltage or current signal.

Figure 14:
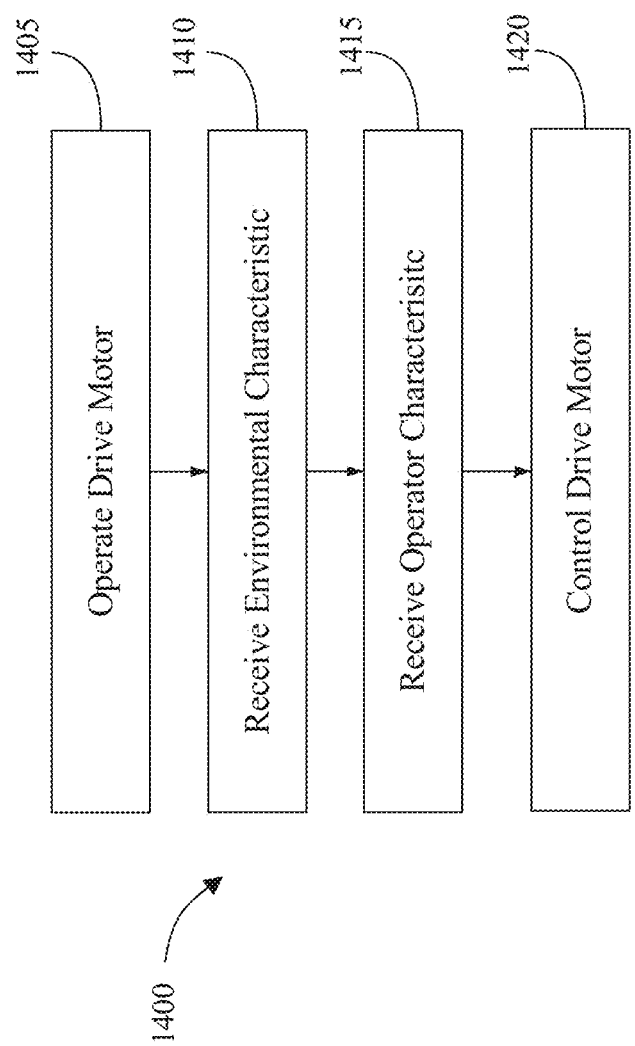
FIG. 14 is a flowchart of an exemplary embodiment of a method for guided autonomous locomotion of a carriage in accordance with one or more embodiments of the present disclosure.

Referring now to FIG. 14, a flow chart diagrams a method 1130 of guided autonomous locomotion of a carriage. At step 1135, method 1130 includes operating drive motor 112, 412 using a controller 140, 440, 1004. Operating drive motor 112, 412 may cause rotation of drive wheel 116, 416 configured to contact a support surface; in some cases, drive wheel 120, 420 is operatively coupled to drive motor 112, 412 by way of drivetrain 116, 416. A controller may be any controller described in this disclosure, for instance in reference to FIGS. 1-14. An at least a drive motor may be any drive motor described in this disclosure, for instance in reference to FIGS. 1-14. Drive wheel may be any at least a drive wheel described in this disclosure, for instance in reference to FIGS. 1-14. Drivetrain may be any at least a drivetrain described in this disclosure, for instance in reference to FIGS. 1-14.

Still referring to FIG. 14, at step 1410, method 1400 includes receiving, by controller 140,1004 an environmental characteristic related to environment, such as obstacle 128, substantially surrounding carriage. In some cases, at least an environmental characteristic may be sensed by environmental sensor 124,424. In some embodiments, sensing an environmental characteristic may additionally include sensing an image of an environment substantially surrounding a carriage and analyzing the image of the environment. At least an environmental sensor may be any at least an environmental sensor described above, for instance in reference to FIGS. 1-14. At least an environmental characteristic may be any at least an environmental characteristic described in this disclosure, for instance in reference to FIGS. 1-14. At least an environment may be any environment described above, for instance in reference to FIGS. 1-14.

Still referring to FIG. 14, at step 1415, method 1400 may include receiving, by controller, an operator characteristic related to an operator or child of carriage. In some cases, at least an operator characteristic may be sensed by operator sensor 132, 432. In some embodiments, sensing an operator characteristic may additionally include sensing an image of an operator and analyzing the image of the operator. At least an operator sensor may be any at least an operator sensor described in this disclosure, for instance in reference to FIGS. 1-12. At least an operator characteristic may be any at least an operator characteristic described in this disclosure, for instance in reference to FIGS. 1-14. At least an operator may be any operator described in this disclosure, for instance in reference to FIGS. 1-14.

Still referring to FIG. 14, at step 1420, method 1400 may include controlling, by controller, drive motor in response to an environmental characteristic and an operator characteristic. Controller may include any controller described in this disclosure, for example in reference to FIGS. 1-14. Controller may also include any computing device described in this disclosure, for example in reference to FIGS. 1-14.

Continuing in reference to FIG. 14, in some embodiments, method 1400 may additionally include controlling, using a controller, a hinge motor in response to at least an operator characteristic or command and folding, using controller and hinge motor, frame of carriage, where hinge motor is operatively coupled to hinge, which is configured to fold frame by way of, for example, a folding hinge, such as hinge 444. A hinge motor may be any hinge motor described above, for instance in reference to FIGS. 1-14. A hinge may be hinge described above, for instance in reference to FIGS. 1-14. A frame may be any frame described above, for instance in reference to FIGS. 1-14. At least a folding hinge may be any at least a folding hinge 444 described above in this disclosure.

Continuing in reference to FIG. 14, in some embodiments, method 1400 may additionally include controlling, using a controller, at least a brake in response to at least an environmental characteristic and preventing or slowing rotation, using the controller and the at least a brake, of one or more of the at least a drive wheel or at least a non-drive wheel configured to contact a support surface. At least a brake may include any brake described above, for example in reference to FIGS. 1-14. At least a non-drive wheel may include any non-drive wheel described above, for example in reference to FIGS. 1-14. In some cases, preventing rotation may additionally include controlling, using a controller, an electromagnetic brake. An electromagnetic brake may include any electromagnetic brake described above, for example in reference to FIGS. 1-14. In some cases, stopping rotation may additionally include controlling, using a controller, a friction brake. A friction brake may include any friction brake described above, for example in reference to FIGS. 1-14.

Continuing in reference to FIG. 14, in some embodiments, method 1400 may additionally include controlling, using a controller, at least a drive motor to generate electrical energy and preventing rotation, using the controller and the at least a drive motor, of at least a drive wheel, as a result of the generated electrical energy. In some case, preventing rotation may be achieved through dynamic braking as described above, for instance in reference to FIGS. 1-14.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
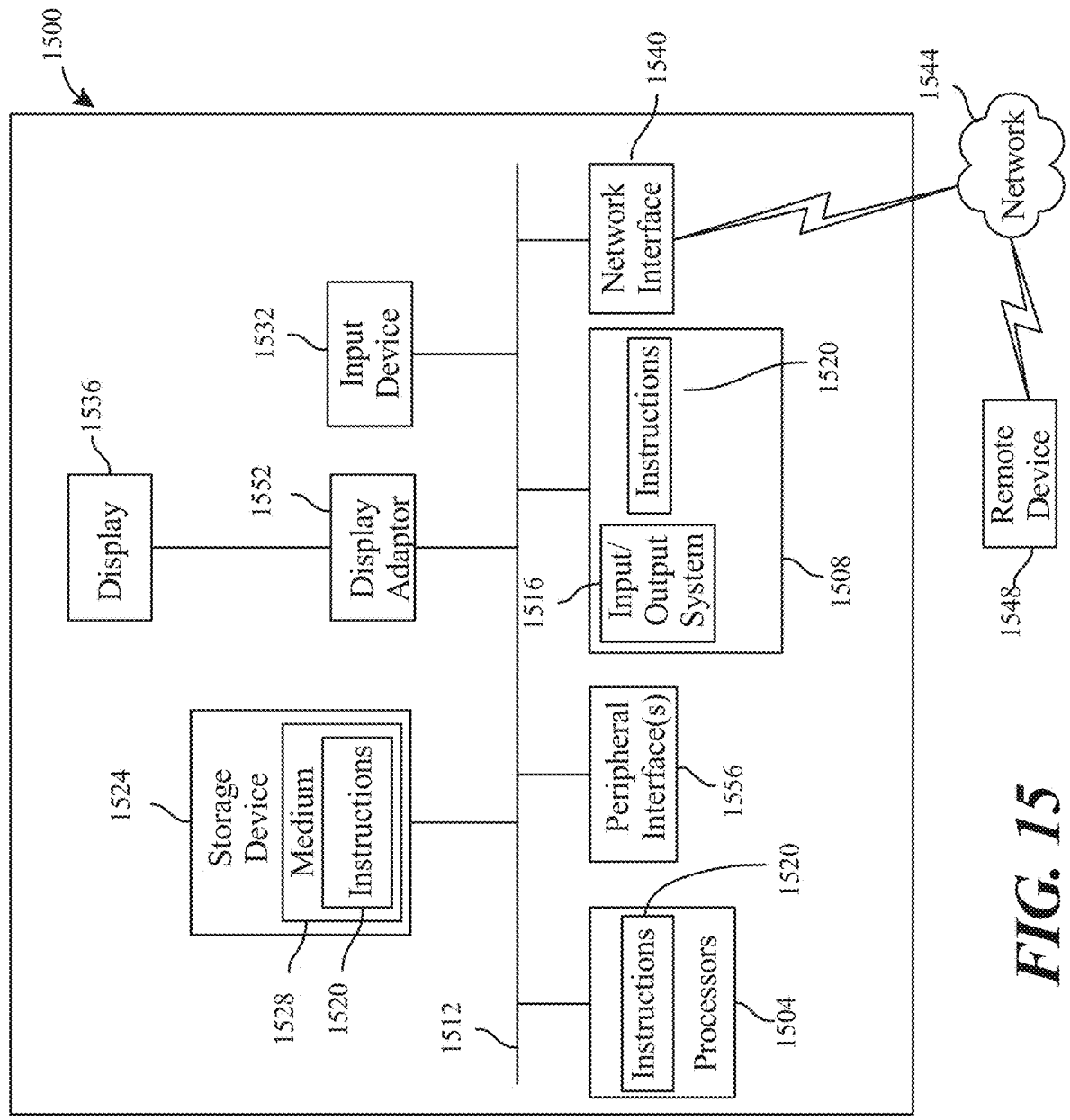
FIG. 15 is a block diagram of a computing system that can be used to implement any one or more of the methodologies disclosed herein and any one or more portions thereof.

FIG. 15 shows a diagrammatic representation of one embodiment of a computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer device 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures. In one or more embodiments, computing device 1500 may include controller 1004, controller 140, 1004.

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 604 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A carriage with guided autonomous locomotion, the carriage comprising:
    a compartment configured to ensconce a child;
    a frame configured to statically support the compartment;
    a drive motor, wherein the drive motor comprises a plurality of motors, each of which configured to either drive a drive wheel or telescope a handle of the carriage;
    a drivetrain operatively coupled to the drive motor;
    the drive wheel rotatably affixed to the frame, configured to contact a support surface, and operatively coupled to the drivetrain, wherein operating the drive motor causes the drive wheel to rotate;
    an operating switch located on the frame and configured for selection of one or more preconfigured motions of the carriage, wherein at least one of the one or more preconfigured motions comprises a rocking motion;
    an adjustable environmental sensor attached to a downward-facing surface of the frame, wherein adjusting the environmental sensor comprises an upward or downward change in an angle the adjustable environmental sensor is facing, wherein the adjustable environmental sensor is configured to sense an environmental characteristic related to an environment substantially surrounding the carriage;
    an operator sensor comprising a movement sensor and an audio sensor used in tandem configured to detect a child characteristic of a child crying;
    a handle bar comprising a vibrational element configured to provide haptic feedback including a physical response based on the environmental characteristic; and
    a controller configured to control:
        the drive motor in response to the environmental characteristic and the operating switch; and
        the compartment based on the child characteristic, wherein controlling the compartment based on the child characteristic comprises playing white noise in response to the child crying.

2. The carriage of claim 1, wherein the frame comprises a hinge that is configured to fold the frame.

3. The carriage of claim 2, wherein the hinge comprises at least a folding hinge, which comprises a plurality of links configured to attached to the frame.

4. The carriage of claim 3, wherein the hinge further comprises a hollow interior, the hollow interior configured to route at least a wire from a first arm of the frame to a second arm of the frame.

5. The carriage of claim 1 further comprising:
    a brake configured to prevent rotation of the drive wheel or a non-drive wheel rotatably affixed to the frame and configured to contact the support surface, wherein the controller is configured to control the brake in response to the environmental characteristic.

6. The carriage of claim 5, wherein the brake is configured to prevent rotation through electromagnetic braking.

7. The carriage of claim 5, wherein the brake is configured to prevent rotation through friction braking.

8. The carriage of claim 1, wherein the drive motor is configured to prevent rotation of the drive wheel using a generative load.

9. The carriage of claim 1, wherein a rotational axis of the drive wheel is substantially parallel and non-concentric to a rotational axis of a drive component of the drivetrain.

10. The carriage of claim 1, wherein the drivetrain comprises one or more of a gear, a belt, a chain, a shaft, a pneumatic drive, a hydraulic drive, and a friction drive.

11. A method of guided autonomous locomotion of a carriage, the method comprising:
    operating, using a controller, a drive motor, wherein the drive motor comprises a plurality of motors, each of which configured to either drive a drive wheel or telescope a handle of the carriage, and wherein operating the drive motor causes rotation of the drive wheel configured to contact a support surface and operatively coupled to the drive motor by way of a drivetrain;
    receiving by an adjustable environmental sensor, using the controller, an environmental characteristic related to an environment substantially surrounding the carriage, wherein the adjustable environmental sensor is attached to a downward-facing surface of a frame of the carriage, wherein adjusting the environmental sensor comprises an upward or downward change in an angle the adjustable environmental sensor is facing;
    providing, by a handle bar comprising a vibrational element, haptic feedback including a physical response based on the environmental characteristic;

receiving, using the controller, a selection of one or more preconfigured motions from an operating switch located on a frame of the carriage, wherein at least one of the one or more preconfigured motions comprises a rocking motion;

receiving, using the controller, an operator characteristic related to an operator of the carriage and a child characteristic of a child crying, wherein the child characteristic is related to a child ensconced within the carriage;

sensing, using an operator sensor, the child characteristic of a child crying, wherein the operator sensor comprises a movement sensor and an audio sensor used in tandem; and controlling, using the controller:
- the drive motor in response to the environmental characteristic, the operator characteristic and the selection; and
- a compartment of the carriage based on the child characteristic, wherein controlling the compartment based on the child characteristic comprises playing white noise in response to the child crying.

12. The method of claim 11, wherein sensing the environmental characteristic further comprises:
sensing an image of the environment; and
analyzing the image of the surrounding environment.

13. The method of claim 11, further comprising sensing, using an operator sensor, the operator characteristic.

14. The method of claim 13, wherein sensing the operator characteristic further comprises:
sensing an image of the operator; and
analyzing the image of the operator.

15. The method of claim 11, further comprising:
controlling, using the controller, a brake in response to the environmental characteristic; and
preventing rotation, using the controller and the brake, of one or more of the drive wheel or a non-drive wheel configured to contact the support surface.

16. The method of claim 15, wherein preventing rotation further comprises controlling, using the controller, an electromagnetic brake.

17. The method of claim 15, wherein preventing rotation further comprises controlling, using the controller, a friction brake.

18. The method of claim 11, further comprising:
controlling, using the controller, the drive motor to generate electrical energy; and
preventing rotation, using the controller and the drive motor, of the drive wheel as a result of the generated electrical energy.

* * * * *